United States Patent
Nakayashiki et al.

(10) Patent No.: US 12,322,980 B2
(45) Date of Patent: Jun. 3, 2025

(54) POWER SUPPLY SYSTEM

(71) Applicant: DENSO CORPORATION, Kariya (JP)

(72) Inventors: Yusei Nakayashiki, Kariya (JP);
Masaya Takahashi, Kariya (JP);
Nobuhisa Yamaguchi, Kariya (JP);
Eisuke Takahashi, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 22 days.

(21) Appl. No.: 18/522,429

(22) Filed: Nov. 29, 2023

(65) Prior Publication Data

US 2024/0097496 A1 Mar. 21, 2024

Related U.S. Application Data

(63) Continuation of application No. PCT/JP2022/016803, filed on Mar. 31, 2022.

(30) Foreign Application Priority Data

May 31, 2021 (JP) ................................. 2021-090828
Mar. 31, 2022 (JP) ................................. 2022-058371

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *B60L 53/62* (2019.02); *H02J 50/90* (2016.02)

(58) Field of Classification Search
CPC . H02J 50/12; H02J 50/90; H02J 50/80; B60L 53/122; B60L 53/62; B60L 5/00;
(Continued)

(56) References Cited

U.S. PATENT DOCUMENTS

| | | | |
|---|---|---|---|
| 2010/0181845 A1 | 7/2010 | Fiorello et al. | |
| 2012/0068548 A1* | 3/2012 | Endo | H02J 50/12 307/104 |

(Continued)

FOREIGN PATENT DOCUMENTS

| | | |
|---|---|---|
| JP | 2014-121113 A | 6/2014 |
| JP | 2016-111727 A | 6/2016 |

(Continued)

*Primary Examiner* — Lincoln D Donovan
*Assistant Examiner* — Alex W Lam
(74) *Attorney, Agent, or Firm* — Oliff PLC

(57) ABSTRACT

A power supply system includes: a power transmission circuit provided on the ground side; a high frequency generation circuit that supplies high-frequency electric power to the power transmission circuit; a measurement unit that measures a physical quantity corresponding to the degree of coupling between the power transmission circuit and a power reception circuit provided in a vehicle; and a control unit. When the degree of coupling is determined, based on the measured physical quantity, to be lower than a predetermined degree, the control unit sets the impedance of the power transmission circuit to a first impedance and thereby sets the power transmission circuit to a non-resonant state. In contrast, when the degree of coupling is determined to be not lower than the predetermined degree, the control unit sets the impedance of the power transmission circuit to a second impedance and thereby sets the power transmission circuit to a resonant state.

21 Claims, 32 Drawing Sheets

(51) Int. Cl.
*B60L 53/62* (2019.01)
*H02J 50/90* (2016.01)

(58) Field of Classification Search
CPC ..... Y02T 10/7072; Y02T 90/14; Y02T 10/70; B60M 7/00
See application file for complete search history.

(56) References Cited

U.S. PATENT DOCUMENTS

| | | | | |
|---|---|---|---|---|
| 2013/0313893 | A1* | 11/2013 | Ichikawa | B60L 53/36 307/104 |
| 2014/0300202 | A1* | 10/2014 | Shimokawa | H02J 50/12 307/104 |
| 2022/0149664 | A1* | 5/2022 | Takahashi | H02J 50/12 |

FOREIGN PATENT DOCUMENTS

| | | |
|---|---|---|
| JP | 2017-51074 A | 3/2017 |
| JP | 2021-23094 A | 2/2021 |
| WO | 2011/112795 A1 | 9/2011 |

* cited by examiner

| STATE | SW1 | Cg | IMPEDANCE OF POWER TRANSMISSION CIRCUIT | RESONANT STATE | POWER SUPPLY |
|---|---|---|---|---|---|
| 1ST STATE | OFF | C1 | HIGH | NON-RESONANT | STANDBY STATE |
| 2ND STATE | ON | C1+C2 | LOW | RESONANT | POWER SUPPLY STATE |

POWER SUPPLY SYSTEM

CROSS-REFERENCE TO RELATED APPLICATIONS

The present application is a continuation application of International Application No. PCT/JP2022/016803 filed on Mar. 31, 2022, which is based on and claims priority from Japanese applications No. 2021-090828 filed on May 31, 2021 and No. 2022-058371 filed on Mar. 31, 2022. The entire contents of these applications are incorporated by reference into the present application.

BACKGROUND

1 Technical Field

The present disclosure relates to power supply systems.

2 Description of Related Art

Japanese Unexamined Patent Application Publication No. JP2017051074A discloses a wireless power supply system that can simultaneously supply electric power to a plurality of power reception apparatuses, can supply electric power to only those of power transmission coils which are required to transmit electric power, and can suppress the manufacturing cost. Japanese Unexamined Patent Application Publication No. JP2016111727A discloses a wireless power supply system that includes a power transmission apparatus capable of detecting the position of a power reception apparatus and supplying electric power to the power reception apparatus when the power reception apparatus is present within a region where it can receive electric power from the power transmission apparatus.

SUMMARY

According to the present disclosure, there is provided a power supply system for supplying electric power to a traveling vehicle in a wireless manner. The power supply system includes: a power transmission circuit which includes, on the ground side, a power transmission coil and a capacitor and whose impedance is switchable between a first impedance and a second impedance that is lower than the first impedance; a high frequency generation circuit connected with the power transmission circuit to supply high-frequency electric power of a predetermined frequency to the power transmission coil of the power transmission circuit; a measurement unit that measures a physical quantity corresponding to the degree of coupling between the power transmission circuit and a power reception circuit that includes a power reception coil provided in the vehicle; and a control unit that controls transmission of electric power from the power transmission circuit to the power reception circuit. Moreover, when the degree of coupling is determined, based on the measured physical quantity, to be lower than a predetermined degree, the control unit sets the power transmission circuit supplied with the high-frequency electric power to a first state that is a non-resonant state by setting the impedance of the power transmission circuit to the first impedance. In contrast, when the degree of coupling is determined, based on the measured physical quantity, to be higher than or equal to the predetermined degree, the control unit sets the power transmission circuit supplied with the high-frequency electric power to a second state that is a resonant state by setting the impedance of the power transmission circuit to the second impedance.

DESCRIPTION OF EMBODIMENTS

Figure 1:
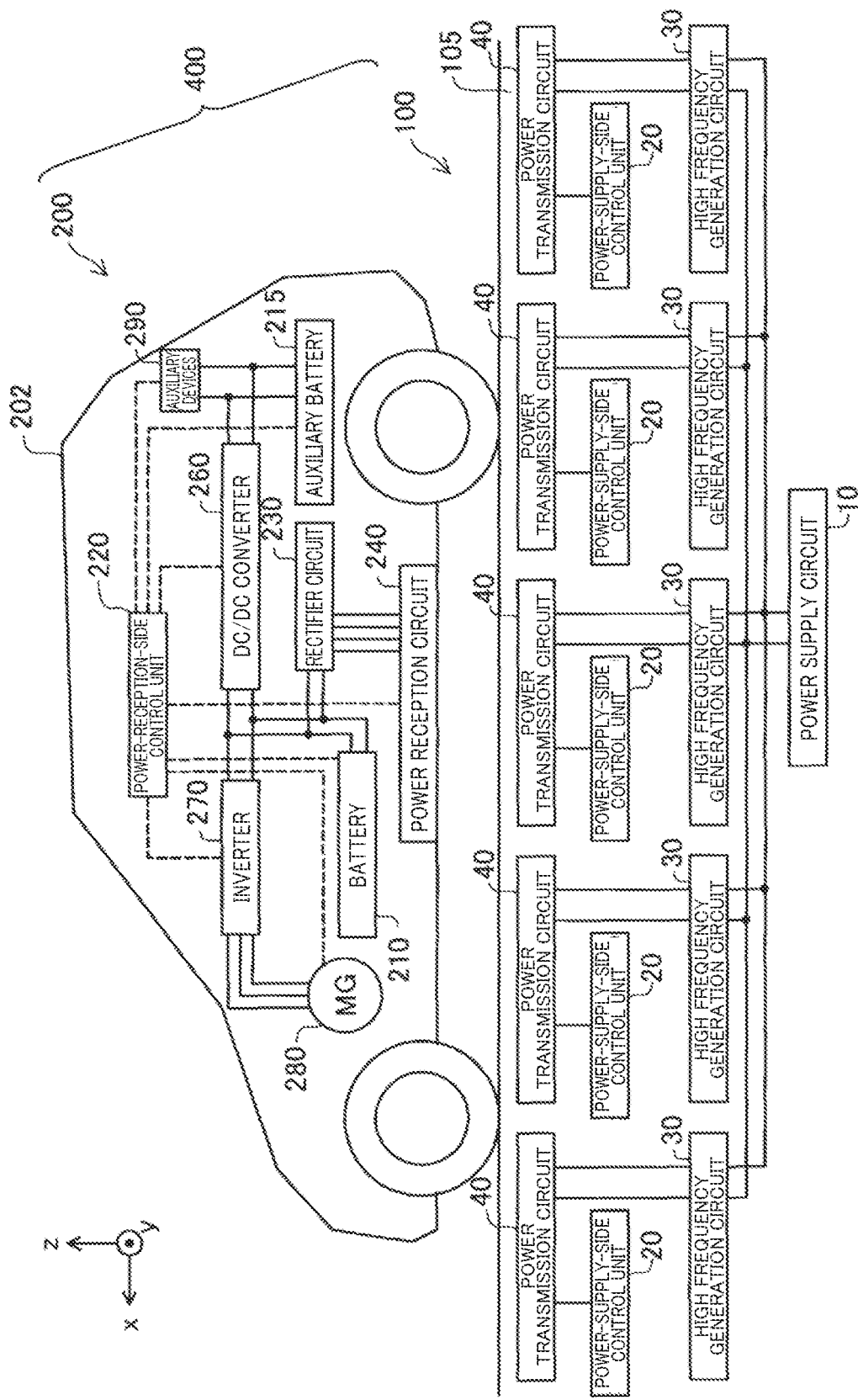
FIG. 1 is an explanatory diagram illustrating the configuration of a power supply system according to a first embodiment.

In both the aforementioned wireless power supply systems disclosed in JP2017051074A and JP2016111727A, for suppressing wasteful consumption of electric power, it is required to detect, using a communication apparatus, the fact that a power reception coil is present at a position where it can efficiently receive electric power from a power transmission coil. Specifically, in the system disclosed in JP2017051074A, there is employed an independent communication apparatus. On the other hand, in the system disclosed in JP2016111727A, there is employed a special transmission/reception apparatus for performing communication by superimposing a specific code on a high-frequency electric power to be applied to the power transmission coil for the supply of electric power to the power reception coil. Thus, it is desired to reduce electric power supply loss in a state where electric power cannot be supplied and to efficiently supply electric power in a state where electric power can be supplied, without employing any communication apparatus.

In contrast, with the configuration of the above-described power supply system according to the present disclosure, the control unit determines, by measuring the physical quantity of the power transmission coil with the impedance of the power transmission circuit set to the predetermined first impedance, whether the degree of coupling has become higher than or equal to the predetermined degree, i.e., whether the power reception coil has approached the power transmission coil to the extent that electric power can be supplied from the power transmission coil to the power reception coil. Moreover, when the power reception coil has approached the power transmission coil to the extent that electric power can be supplied from the power transmission coil to the power reception coil, the control unit sets the impedance of the power transmission circuit to the second impedance that is lower than the first impedance and thereby switches the power transmission circuit to the second state that is the resonant state, thereby supplying electric power from the power transmission coil to the power reception coil. On the other hand, when the power reception coil has not approached the power transmission coil to the extent that electric power can be supplied from the power transmission coil to the power reception coil, the control unit keeps the impedance of the power transmission circuit at the first impedance and thus keeps the power transmission circuit in the first state that is the non-resonant state, thereby suppressing the supply of electric power from the power transmission coil to the power reception coil to reduce the power supply loss. In this way, when the power reception coil has approached the power transmission coil to the extent that electric power can be supplied from the power transmission coil to the power reception coil, the control unit can efficiently supply electric power from the power transmission coil to the power reception coil by setting the impedance of the power transmission circuit to the second impedance and thus setting the power transmission circuit to the second state that is the resonant state.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

FIG. 1 is an explanatory diagram illustrating the configuration of a power supply system 400 according to the first embodiment. The power supply system 400 includes a power transmission system 100 provided on the ground side such as in a road 105, and a power reception system 200 provided in a vehicle 202 that is a moving object. The power supply system 400 is a system capable of supplying electric power from the power transmission system 100 to the vehicle 202 during traveling of the vehicle 202. Here, the expression "during traveling of the vehicle 202" encompasses not only the case of the vehicle 202 being moving, but also the case of the vehicle 202 being in a stopped state, such as waiting for traffic lights to change. The vehicle 202 may be configured as, for example, an electric vehicle or a hybrid vehicle. Alternatively, the vehicle 202 may be configured as an AGV (Automatic Guided Vehicle) or a mobile robot. In addition, in FIG. 1, the x direction represents the traveling direction of the vehicle 202; the y direction represents the width direction of the vehicle 202; and the z direction represents the vertically upward direction.

The power transmission system 100 on the road 105 side includes: a plurality of power transmission circuits 40 arranged in the ground of the road 105 and in alignment with each other along the road 105; a plurality of high frequency generation circuits 30 that supply a high-frequency AC voltage respectively to the plurality of power transmission circuits 40; a power supply circuit 10 that supplies a DC voltage to the plurality of high frequency generation circuits 30; and a plurality of power-supply-side control units 20. In addition, the power transmission circuits 40 may alternatively be arranged at locations other than the ground of the road 105, for example on a side wall or a guardrail of the road 105.

As will be described later, each of the power transmission circuits 40 includes a power transmission coil and capacitors that together constitute a resonant circuit. The power transmission coils of the power transmission circuits 40 are installed along the x direction and at a predetermined depth from the ground surface of the road 105. Each of the high frequency generation circuits 30 is a circuit that supplies high-frequency electric power to a corresponding one of the power transmission circuits 40 through conversion of the DC voltage supplied from the power supply circuit 10 into the high-frequency AC voltage. Each of the high frequency generation circuits 30 includes an inverter circuit (not shown). It should be noted that each of the high frequency generation circuits 30 may further include a filter circuit in addition to the inverter circuit. The power supply circuit 10 is a circuit that supplies DC power to the high frequency generation circuits 30. For example, the power supply circuit 10 may be configured as an AC/DC converter circuit that rectifies alternating current supplied from a commercial power source into direct current and outputs the direct current. In addition, the direct current outputted from the power supply circuit 10 may not be perfect direct current; that is, the direct current may include fluctuation (or ripple) to a certain extent. Each of the power-supply-side control units 20 switches the state of a corresponding one of the power transmission circuits 40 between a first state and a second state. In the second state, each of the power-supply-side control units 20 sets the corresponding power transmission circuit 40 to a resonant state and causes the corresponding power transmission circuit 40 to supply electric power to the power reception system 200. In contrast, in the first state, each of the power-supply-side control units 20 sets the corresponding power transmission circuit 40 to a non-resonant state and restricts the corresponding power transmission circuit 40 from supplying electric power to the power reception system 200.

The vehicle 202 includes a battery 210, an auxiliary battery 215, a power-reception-side control unit 220, a rectifier circuit 230, a power reception circuit 240, a DC/DC converter circuit 260, an inverter circuit 270, a motor-generator 280 and auxiliary devices 290. In the present embodiment, the power reception circuit 240 is provided at a position facing the road 105, for example on a bottom surface of the vehicle 202. In addition, in the case of the power transmission circuits 40 being arranged on a side wall or a guardrail of the road 105, the power reception circuit 240 may be provided on a side surface of the vehicle 202. As will be described later, the power reception circuit 240 includes a power reception coil and a capacitor that together constitute a resonant circuit. The power reception circuit 240 is connected with the rectifier circuit 230, so that the AC power received by the power reception circuit 240 can be rectified into DC power by the rectifier circuit 230. To an output side of the rectifier circuit 230, there are connected the battery 210, a higher-voltage side of the DC/DC converter circuit 260 and the inverter circuit 270. Further, to a lower-voltage side of the DC/DC converter circuit 260, there are connected the auxiliary battery 215 and the auxiliary devices 290. To the inverter circuit 270, there is connected the motor-generator 280. The DC voltage outputted from the rectifier circuit 230 can be used to charge the battery 210 and to drive the motor generator 280 via the inverter circuit 270. Moreover, the DC voltage outputted from the rectifier circuit 230 can also be used, by being stepped down using the DC/DC converter circuit 260, to charge the auxiliary battery 215 and drive the auxiliary devices 290.

The battery 210 is a secondary battery that outputs a relatively high DC voltage, for example several hundred volts, for driving the motor-generator 280. The motor-generator 280 operates as a three-phase AC motor to generate a driving force for driving the vehicle 202 to travel, Otherwise, during deceleration of the vehicle 202, the motor-generator 280 operates as an electric generator to regenerate three-phase AC power. Moreover, when the motor-generator 280 operates as a three-phase AC motor, the inverter circuit 270 converts the DC power outputted from the battery 210 into three-phase AC power and supplies the three-phase AC power to the motor-generator 280. Otherwise, when the motor-generator 280 operates as an electric generator, the inverter circuit 270 converts the three-phase AC power regenerated by the motor-generator 280 into DC power and supplies the DC power to the battery 210.

The DC/DC converter circuit 260 converts the DC voltage outputted from the battery 210 into a lower DC voltage, for example 12V, and supplies the lower DC voltage to the auxiliary battery 215 and the auxiliary devices 290. The auxiliary battery 215 is a secondary battery that outputs a relatively low DC voltage for driving the auxiliary devices 290. The auxiliary devices 290 include peripheral devices, such as an air conditioner, an electric power steering device, a headlight, a direction indicator and a wiper of the vehicle 202, and various accessories of the vehicle 202.

The power-reception-side control unit 220 controls the inverter circuit 270 and other components in vehicle 202. When the vehicle 202 receives wireless power supply during traveling thereof, the power-reception-side control unit 220 controls the power reception circuit 240 to receive the supplied electric power.

Figure 2:
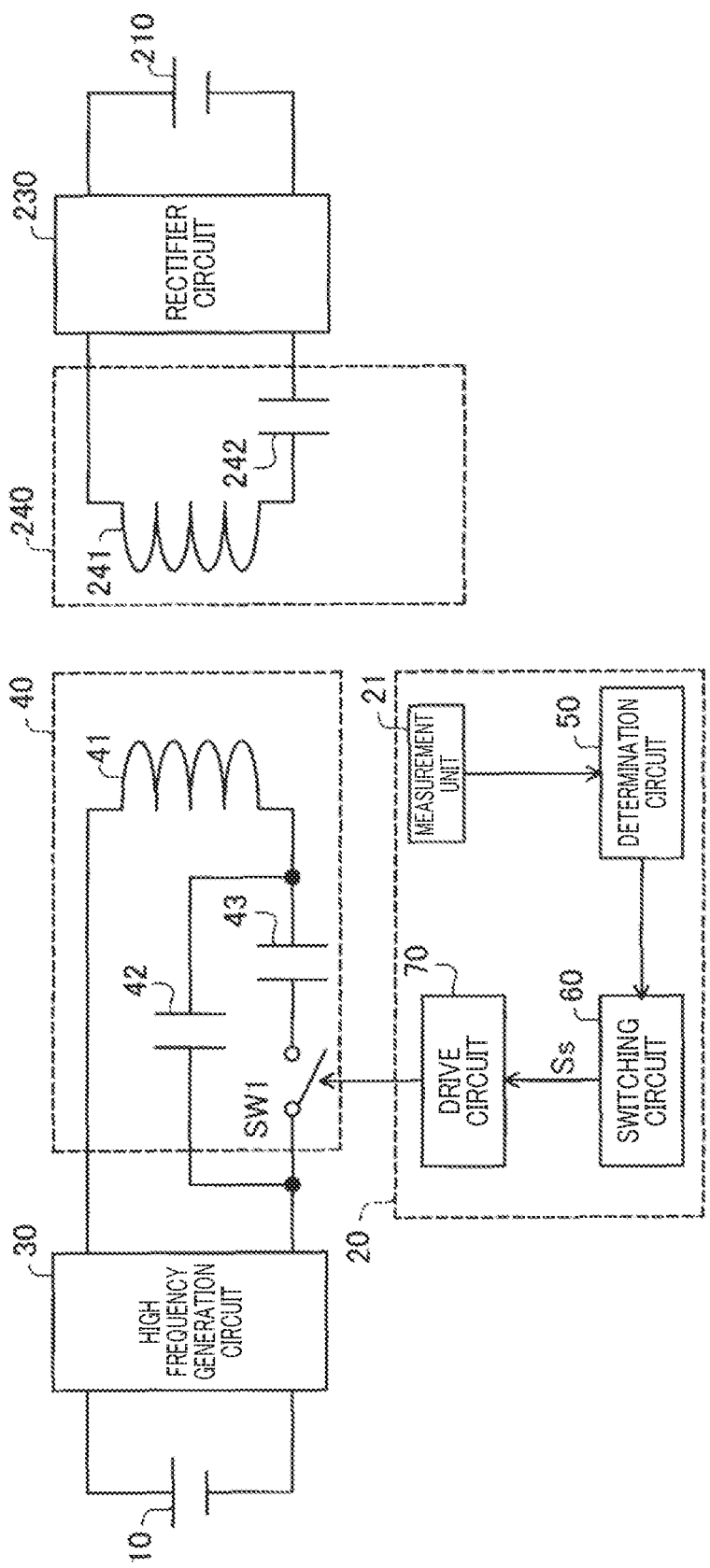
FIG. 2 is an explanatory diagram illustrating the schematic configuration of a power transmission circuit, a power reception circuit and a power-supply-side control unit.

FIG. 2 is an explanatory diagram illustrating the schematic configuration of each power transmission circuit 40, the power reception circuit 240 and each power-supply-side control unit 20. Each power transmission circuit 40 includes a power transmission coil 41, two capacitors 42 and 43 and a switch SW1. The capacitor 42 and the power transmission coil 41 are connected in series with each other. The capacitor 43 and the switch SW1 are connected in series with each other. Further, the serially-connected capacitor 43 and switch SW1 are connected in parallel to the capacitor 42. The power transmission coil 41 and the two capacitors 42 and 43 together constitute a resonant circuit. On the other hand, the power reception circuit 240 has a power reception coil 241 and a capacitor 242 connected in series with each other. The power reception coil 241 and the capacitor 242 together constitute a resonant circuit.

Let C1 be the capacitance of the capacitor 42, C2 be the capacitance of the capacitor 43. L1 be the inductance of the power transmission coil 41, and R be the electrical resistance of the wiring. Then, the impedance Zon of each power transmission circuit 40 can be expressed by the following equation:

$$Zon = R + j(\omega L1 - 1/\omega Cg)$$

where Cg=C1 when the switch SW1 is in an off-state and thus the capacitor 43 is disconnected, and Cg=C1+C2 when the switch SW1 is in an on-state and thus the capacitor 43 is connected.

Moreover, in the above equation, ω is the angular frequency and can be expressed by the following equation: ω=2πf, where f is the operating frequency of each power transmission circuit 40. Furthermore, the power transmission coil 41 is magnetically coupled to the power reception coil 241. Hereinafter, the phenomenon that the power transmission coil 41 is magnetically coupled to the power reception coil 241 will be referred to as "coupling". The inductance L1 of the power transmission coil 41 changes depending on the relative positional relationship between the power transmission coil 41 and the power reception coil 241. Let L41 be the inductance of the power transmission coil 41 when the power transmission coil 41 is not coupled with any coils, and L241 be the inductance of the power reception coil 241 when the power reception coil 241 is not coupled with any coils. Then, the inductance L1 of the power transmission coil 41 can be expressed by the following equation:

$$L1 = L41 \pm k(L41 \times L241)^{1/2}$$

where k is the coupling coefficient between the power transmission coil 41 and the power reception coil 241.

The coupling coefficient k is determined by the relative positional relationship between the power transmission coil 41 and the power reception coil 241. The coupling coefficient k becomes highest when the power transmission coil 41 and the power reception coil 241 become closest to each other. In addition, the sign (±) before the second term in the above equation is positive when the winding directions of the power transmission coil 41 and the power reception coil 241 are the same, and is negative when the winding directions are opposite to each other.

Each power-supply-side control unit 20 includes a measurement unit 21, a determination circuit 50, a switching circuit 60 and a drive circuit 70. The measurement unit 21 is constituted of a sensor that measures a physical quantity of the power transmission coil 41 of the corresponding power transmission circuit 40. The physical quantity is an index indicating the degree of resonance of the resonant circuit including the power transmission coil 41 and the capacitors 42 and 43. In the present embodiment, the voltage between both ends of the power transmission coil 41 is used as the physical quantity. In addition, a plurality of types of physical quantities may be used as the physical quantity indicating the degree of resonance of the resonant circuit. That is, physical quantities other than the voltage between both ends of the power transmission coil 41, such as the electric current flowing through the power transmission coil 41, the magnetic flux generated by the power transmission coil 41, the voltage between both ends of the capacitor 42 and the electric current flowing through the capacitor 42, may also be used. Moreover, when the switch SW1 is in the on-state, the voltage between both ends of the capacitor 43 and the electric current flowing through the capacitor 43 may also be used. Hereinafter, the voltage between both ends of the power transmission coil 41 when the switch SW1 is in the off-state will be referred to as the off-voltage Voff; and the voltage between both ends of the power transmission coil 41 when the switch SW1 is in the on-state will be referred to as the on-voltage Von. In addition, the physical quantity detected when the switch SW1 is in the off-state may be different from the physical quantity detected when the switch SW1 is in the on-state. For example, when the switch SW1 is in the off-state, the voltage between both ends of the power transmission coil 41 may be detected as the physical quantity indicating the degree of resonance of the resonant circuit; and when the switch SW1 is in the on-state, physical quantities other than the voltage between both ends of the power transmission coil 41, such as the electric current flowing through the power transmission coil 41 or the voltage between both ends of the capacitor 42, may be detected as the physical quantity indicating the degree of resonance of the resonant circuit.

The determination circuit 50 determines whether the off-voltage Voff when the switch SW1 is in the off-state is higher than or equal to or lower than a threshold value Vth_off_L or a threshold value Vth_off_H, and whether the on-voltage Von when the switch SW1 is in the on-state is higher than or equal to or lower than a threshold value Vth_on_L or a threshold value Vth_on_H. When the off-voltage Voff is higher than or equal to the threshold value Vth_off_L or the threshold value Vth_off_H, a signal Soff is set to a high level (to be referred to as [H] hereinafter). In contrast, when the off-voltage Voff is lower than the threshold value Vth_off_L or the threshold value Vth_off_H, the signal Soff is set to a low level (to be referred to as [L] hereinafter). Moreover, when the on-voltage Von is higher than or equal to the threshold value Vth_on_L or the threshold value Vth_on_H, a signal Son is set to [H]. In contrast, when the on-voltage Von is lower than threshold value Vth_on_L, or the threshold value Vth_on_H, the signal Son is set to [L]. As to which of the threshold values are specifically used in setting the signals Soff and Son, explanation will be given later.

The switching circuit 60 determines, based on the values of the signals Soff and Son, the value of a switching signal Ss for turning on/off the switch SW1. The configurations of the determination circuit 50 and the switching circuit 60 will be described in detail later. The drive circuit 70 drives the on/off switching of the switch SW1 according to the switching signal Ss outputted from the switching circuit 60. The switch SW1 may be implemented by a switch that switches mechanical contacts according to an external command, such as a relay. Alternatively, the switch SW1 may be configured with a semiconductor element such as a MOSFET or an analog switch.

Figures 3, 4:
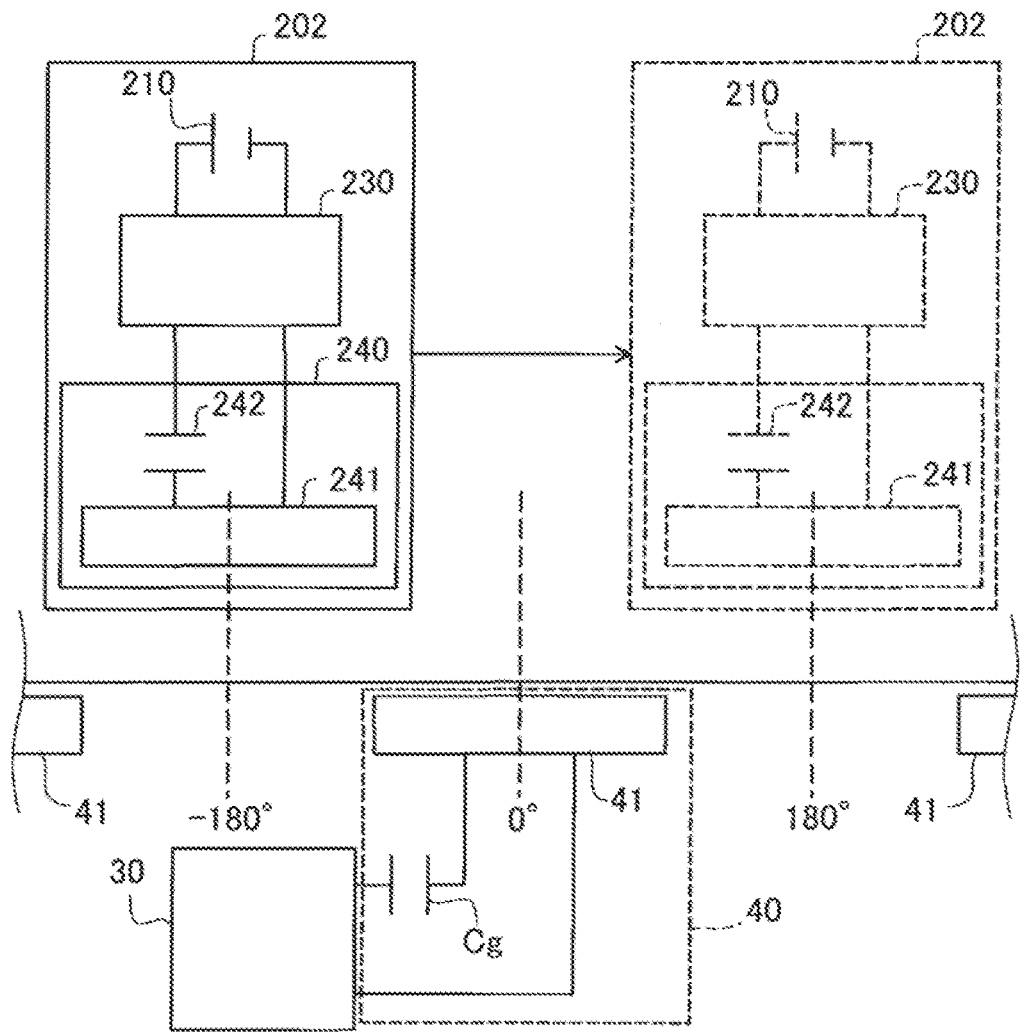
FIG. 3 is an explanatory diagram specifically illustrating the positional relationship between a power transmission coil and a power reception coil that moves along with a vehicle.
FIG. 4 is an explanatory diagram illustrating the relationship between the on/off states of a switch and the impedance and power supply of the power transmission circuit.

FIG. 3 is an explanatory diagram specifically illustrating the positional relationship between the power transmission coils 41 and the power reception coil 241 that moves along with the vehicle 202. The capacitor Cg is the capacitor of each power transmission circuit 40. The off-state of the switch SW1 represents the state where only the capacitor 42 is connected, whereas the on-state of the switch SW1 represents the state where both the capacitor 42 and the capacitor 43 are connected. Since the power transmission coils 41 are arranged at predetermined intervals along the road 105, as the vehicle 202 travels, the positional relationship between the power transmission coils 41 and the power reception coil 241 changes repeatedly with the same phase relationship. FIG. 3 shows this repetition as the phase angle in the range of −180° to +180°. In the traveling direction of the vehicle 202, the center position of each power transmission coil 41 is defined to be 0°, whereas the middle position between each adjacent pair of the power transmission coils 41 is defined to be ±180°. In FIG. 3, the power reception coil 241 is at the position of −180° and the vehicle 202 travels rightward. Therefore, the power reception coil 241 moves from the position of −180° to the position of 180° via the position of 0°.

FIG. 4 is an explanatory diagram illustrating the relationship between the on/off of the switch SW1 and the impedance and power supply of each power transmission circuit 40, in the first state of the power transmission circuit 40, the switch SW1 is in the off-state and the capacitor Cg includes only the capacitor 42. Moreover, in the first state, the impedance of the power transmission circuit 40 is high and the degree of resonance of the power transmission circuit 40 is lower than a predetermined degree. That is, the power transmission circuit 40 is in the non-resonant state. In contrast, in the second state of the power transmission circuit 40, the switch SW1 is in the on-state and the capacitor Cg includes both the capacitor 42 and the capacitor 43. Moreover, in the second state, the impedance of the power transmission circuit 40 is low and the degree of resonance of the power transmission circuit 40 is higher than or equal to the predetermined degree. That is, the power transmission circuit 40 is in the resonant state. The corresponding power-supply-side control unit 20 sets, by turning off the switch SW1, the power transmission circuit 40 to the non-resonant state and thus to a standby state in which the power transmission circuit 40 does not supply electric power to the power reception system 200. Otherwise, the corresponding power-supply-side control unit 20 sets, by turning on the switch SW1, the power transmission circuit 40 to the resonant state and thus to a power supply state in which the power transmission circuit 40 can supply electric power to the power reception system 200. Alternatively, by suitably setting the capacitances of the capacitors 42 and 43 and the inductance of the power transmission coil 41, it is possible to: make the impedance of the power transmission circuit 40 low and set the power transmission circuit 40 to the resonant state when the switch SW1 is in the off-state; and make the impedance of the power transmission circuit 40 high and set the power transmission circuit 40 to the non-resonant state when the switch SW1 is in the on-state. In this case, the corresponding power-supply-side control unit 20 sets the power transmission circuit 40 to the power supply state, in which the power transmission circuit 40 can supply electric power to the power reception system 200, by turning off the switch SW1; otherwise, the corresponding power-supply-side control unit 20 sets the power transmission circuit 40 to the standby state, in which the power transmission circuit 40 does not supply electric power to the power reception system 200, by turning on the switch SW1.

Figure 5:
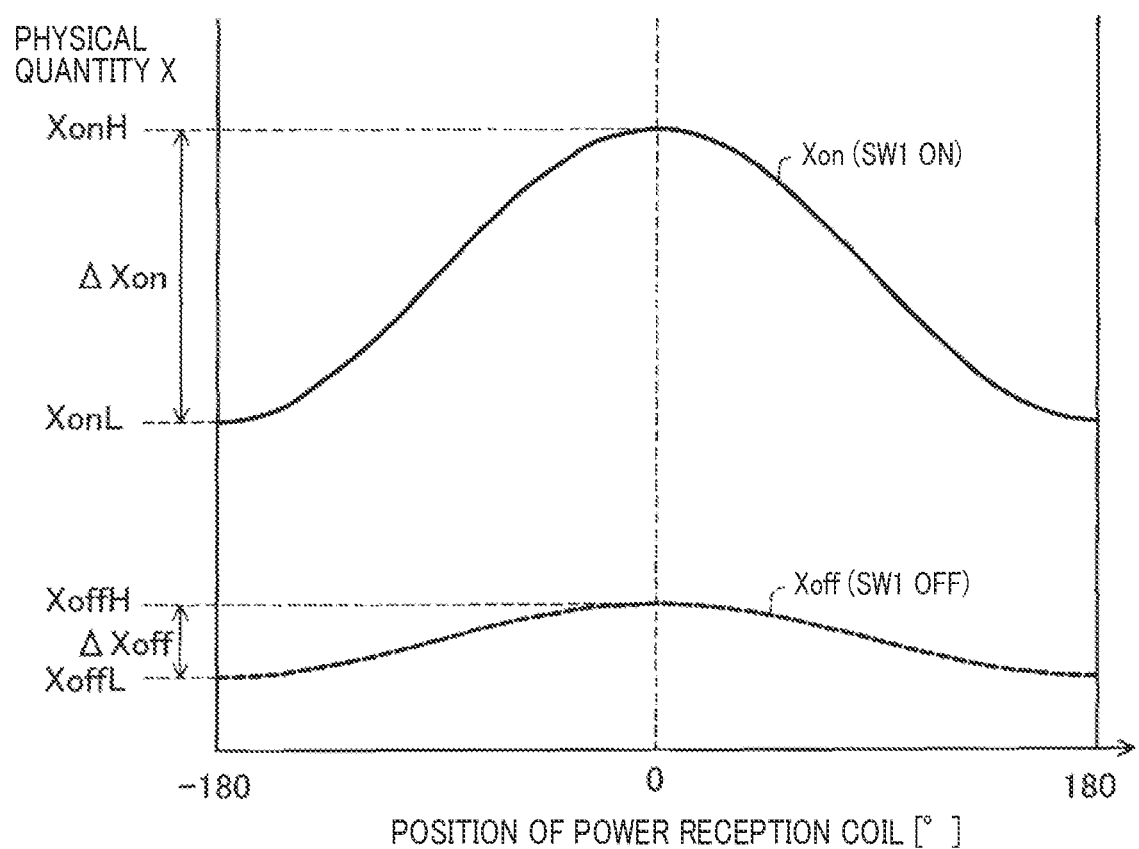
FIG. 5 is an explanatory diagram illustrating the relationship between the position of the power reception coil and a physical quantity of the power transmission coil.

FIG. 5 is an explanatory diagram illustrating the relationship between the position of the power reception coil 241 and the physical quantity X of the power transmission coil 41. The physical quantity X is, for example, the voltage of the power transmission coil 41. Alternatively, the electric current of the power transmission coil 41, the magnetic flux of the power transmission coil 41 or the voltage of the capacitor 42 may be used as the physical quantity X. When the switch SW1 is in the off-state, the impedance of the power transmission circuit 40 is high and thus the physical quantity Xoff of the power transmission coil 41 is low. In contrast, when the switch SW1 is in the on-state, the impedance of the power transmission circuit 40 is low and thus the physical quantity Xon of the power transmission coil 41 is higher than the physical quantity Xoff. Moreover, the physical quantity Xoff in the case of the switch SW1 being in the off-state has a minimum value XoffL when the power reception coil 241 is at the position of ±180°, and has a maximum value XoffH when the power reception coil 241 is at the position of 0°. On the other hand, the physical quantity Xon in the case of the switch SW1 being in the on-state has a minimum value XonL when the power reception coil 241 is at the position of ±180°, and has a maximum value XonH when the power reception coil 241 is at the position of 0°. This is because the power transmission coil 41 is coupled to the power reception coil 241. Specifically, when the power reception coil 241 is at the position of ±180°, the distance between the power transmission coil 41 and the power reception coil 241 is longest and thus the coupling coefficient k becomes lowest. In contrast, when the power reception coil 241 is at the position of 0°, the distance between the power transmission coil 41 and the power reception coil 241 is shortest and thus the coupling coefficient k becomes highest. Furthermore, the difference ΔXon between the minimum value XonL and the maximum value XonH of the physical quantity Xon in the case of the switch SW1 being in the on-state is greater than the difference ΔXoff between the minimum value XoffL and the maximum value XoffH of the physical quantity Xoff in the case of the switch SW1 being in the off-state.

Figure 6:
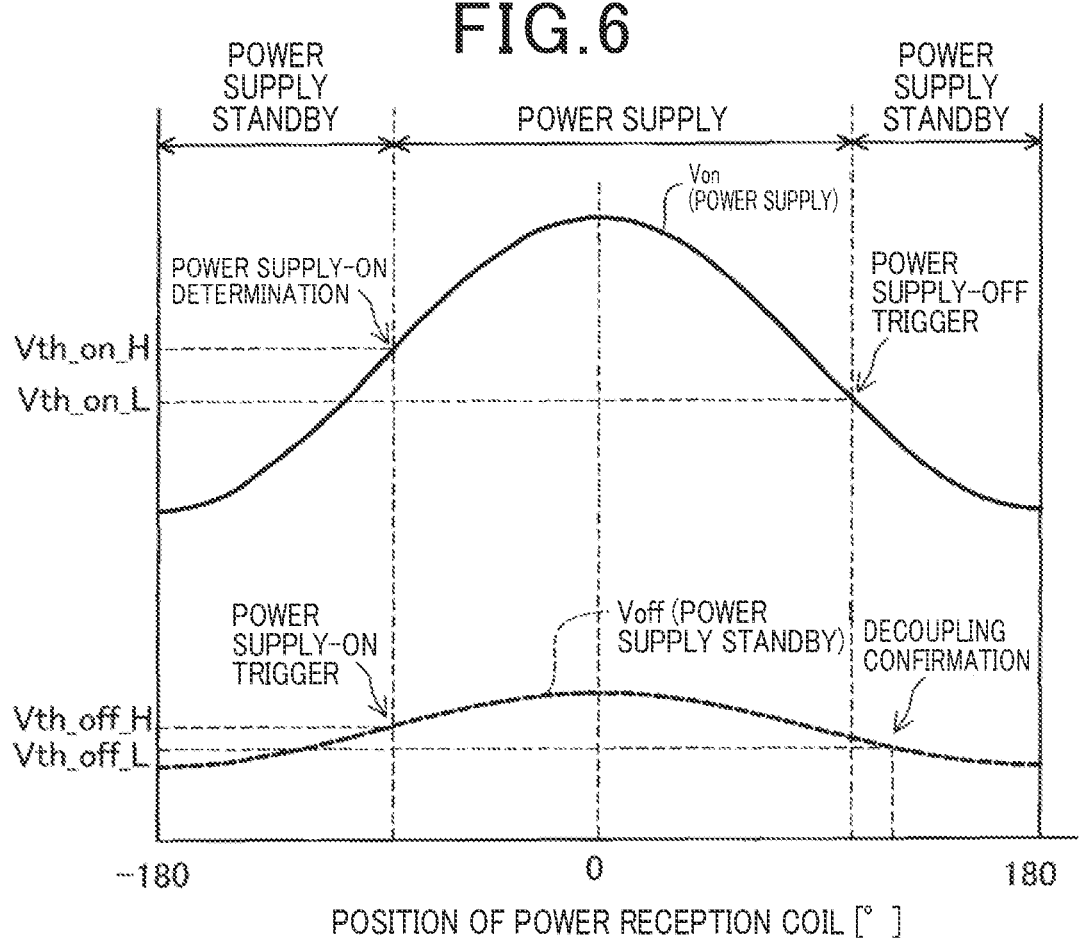
FIG. 6 is an explanatory diagram illustrating the principle of the present disclosure when the physical quantity is the voltage of the power transmission coil.

FIG. 6 is an explanatory diagram illustrating the principle of the present disclosure when the physical quantity is the voltage of the power transmission coil 41. When the power reception coil 241 is at the position of −180° position, the switch SW1 is in the off-state. As the power reception coil 241 approaches the power transmission coil 41, the voltage of the power transmission coil 41 changes as shown in the trajectory of Voff. Upon the voltage Voff of the power transmission coil 41 becoming higher than or equal to the threshold value Vth_off_H that is a first threshold value, a power supply-on trigger is issued, causing the switch SW1 to be turned on. Consequently, the impedance of the power transmission circuit 40 is lowered due to the addition of the capacitor 43 and thus the voltage of the power transmission coil 41 transitions to the trajectory of Von. Further, upon the voltage Von of the power transmission coil 41 becoming higher than or equal to the threshold value Vth_on_H that is a third threshold value, a power supply-on state is determined. On the other hand, if the voltage Von of the power transmission coil 41 is lower than the threshold value Vth_on_H when a predetermined time has elapsed after the switch SW1 is turned on, the switch SW1 is turned off and thus the capacitor 43 is disconnected. Further, upon the capacitor 43 being disconnected, the impedance of the power transmission circuit 40 increases. Consequently, the voltage of the power transmission coil 41 returns to the trajectory of Voff and thus the power transmission circuit 40 is brought into the power supply standby state. Moreover, upon the issuance of the power supply-on trigger, the threshold value for determining the voltage Voff of the power transmission coil 41 is changed to Vth_off_L. In addition, Vth_off_L<Vth_off_H. Furthermore, upon the determination of the power supply-on state, the threshold value for determining the voltage Von of the power transmission coil 41 is changed to Vth_on_L. In addition, Vth_on_L<Vth_on_H.

After the determination of the power supply-on state, when the power reception coil 241 becomes closest to the power transmission coil 41, the voltage Von of the power transmission coil 41 becomes highest. Then, as the power reception coil 241 moves away from the power transmission coil 41, the voltage Von of the power transmission coil 41 is lowered. Upon the voltage Von of the power transmission coil 41 becoming lower than the threshold value Vth_on_L that is a second threshold value, the switch SW1 is turned off and thus the capacitor 43 is disconnected. In addition, Vth_on_L<Vth_on_H. Further, upon the capacitor 43 being disconnected, the impedance of the power transmission circuit 40 increases and thus the voltage of the power transmission coil 41 transitions to the trajectory of Voff. Moreover, the threshold value for determining the voltage Von of the power transmission coil 41 is changed to Vth_on_H. Furthermore, as the power reception coil 241 moves further away from the power transmission coil 41, the voltage Voff of the power transmission coil 41 is lowered. Then, upon the voltage Voff of the power transmission coil 41 becoming lower than Vth_off_L, the threshold value for determining the voltage Voff of the power transmission coil 41 is changed to Vth_off_H.

Figure 7:
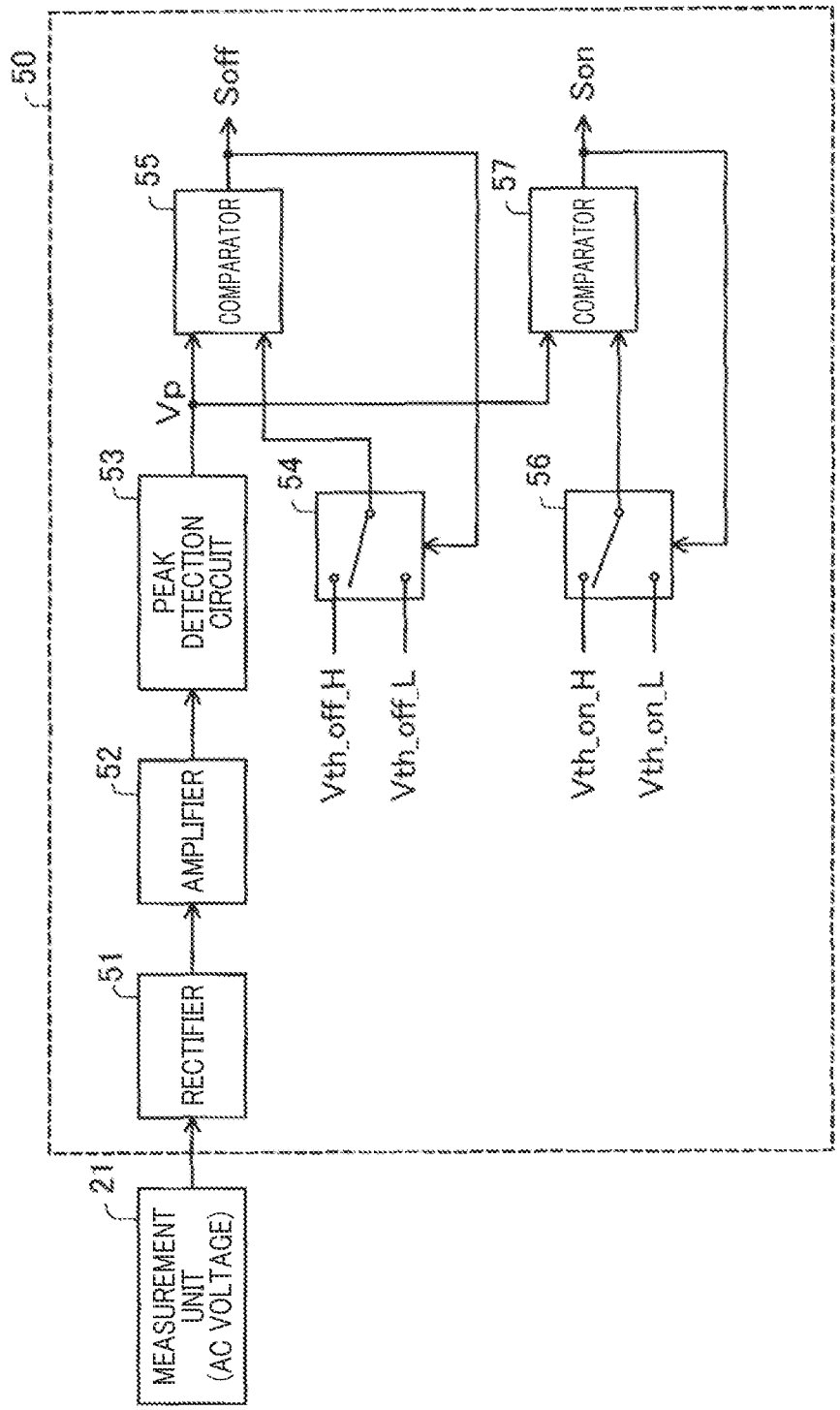
FIG. 7 is an explanatory diagram illustrating the configuration of a determination circuit.

FIG. 7 is an explanatory diagram illustrating the configuration of the determination circuit 50, The determination circuit 50 includes a rectifier 51, an operational amplifier 52, a peak detection circuit 53, threshold value changeover switches 54 and 56, and comparators 55 and 57. The rectifier 51 converts the AC voltage inputted from the measurement unit 21 into a DC voltage. The operational amplifier 52 has a function of adjusting the gain of the DC voltage obtained by the rectifier 51. The peak detection circuit 53 detects a peak voltage Vp of the output of the operational amplifier 52. It should be noted that an integrating circuit or a low-pass filter may be employed instead of the peak detection circuit 53. The threshold value changeover switch 54 sets the threshold value to Vth_off_H when the signal Soff is at [L], and to Vth_off_L when the signal Soff is at [H]. The comparator 55 compares the peak voltage Vp with the threshold value (i.e., Vth_off_H or Vth_off_L). Moreover, the comparator 55 sets the signal Soff to [H] when Vp is higher than or equal to the threshold value, and to [L] when Vp is lower than the threshold value. The threshold value changeover switch 56 sets the threshold value to Vth_on_H when the signal Son is at [L], and to Vth_on_L when the signal Son is at [H]. The comparator 57 compares the peak voltage Vp with the threshold value (i.e., Vth_on_H or Vth_on_L). Moreover, the comparator 57 sets the signal Son to [H] when Vp is higher than or equal to the threshold value, and to [L] when Vp is lower than the threshold value.

When the switch SW1 is in the off-state and the power reception coil 241 is distant from the power transmission coil 41, the peak voltage Vp is lower than threshold value Vth_off_H and thus the signal Soff is at [L]. Therefore, the threshold value is Vth_off_H. As the power reception coil 241 approaches the power transmission coil 41, the peak voltage Vp increases. Upon the peak voltage Vp becoming higher than or equal to the threshold value Vth_off_H, the signal Soff is switched from [L] to [H]. Further, upon the signal Soff being switched to [H], the threshold value is switched to Vth_off_L. In addition, Vth_off_L<Vth_off_H; therefore, Vp>Vth_off_L and thus the signal Soff is kept at [H].

When the switch SW1 is in the off-state and the power reception coil 241 is close to the power transmission coil 41, the peak voltage Vp is higher than or equal to the threshold value Vth_off_L and thus the signal Soff is at [H]. As the power reception coil 241 moves away from the power transmission coil 41, the peak voltage Vp is lowered. Upon the peak voltage Vp becoming lower than the threshold value Vth_off_L, the signal Soff is switched from [H] to [L]. Further, upon the signal Soff being switched to [L], the threshold value is switched to Vth_off_H. In addition, Vth_off_L<Vth_off_H; therefore, Vp<Vth_off_H and thus the signal Soff is kept at [L].

When the switch SW1 is in the on-state and the power reception coil 241 is distant from the power transmission coil 41, the peak voltage Vp is lower than the threshold value Vth_on_H and thus and the signal Son is at [L]. Therefore, the threshold value is Vth_on_H. As the power reception coil 241 approaches the power transmission coil 41, the peak voltage Vp increases. Upon the peak voltage Vp becoming higher than or equal to the threshold value Vth_on_H, the signal Son is switched from [L] to [H]. Further, upon the signal Son being switched to [H], the threshold value is switched to Vth_on_L. In addition, Vth_on_L<Vth_on_H; therefore, Vp>Vth_on_L and thus the signal Son is kept at [H].

When the switch SW1 is in the on-state and the power reception coil 241 is close to the power transmission coil 41, the peak voltage Vp is higher than or equal to the threshold value Vth_on_L and thus the signal Son is at [H]. As the power reception coil 241 moves away from the power transmission coil 41, the peak voltage Vp is lowered. Upon the peak voltage Vp becoming lower than the threshold value Vth_on_L, the signal Son is switched from [H] to [L]. Further, upon the signal Son being switched to [L], the threshold value is switched to Vth_on_H. In addition, Vth_on_L<Vth_on_H; therefore, Vp<Vth_on_H and thus the signal Son is kept at [L].

Figure 8:
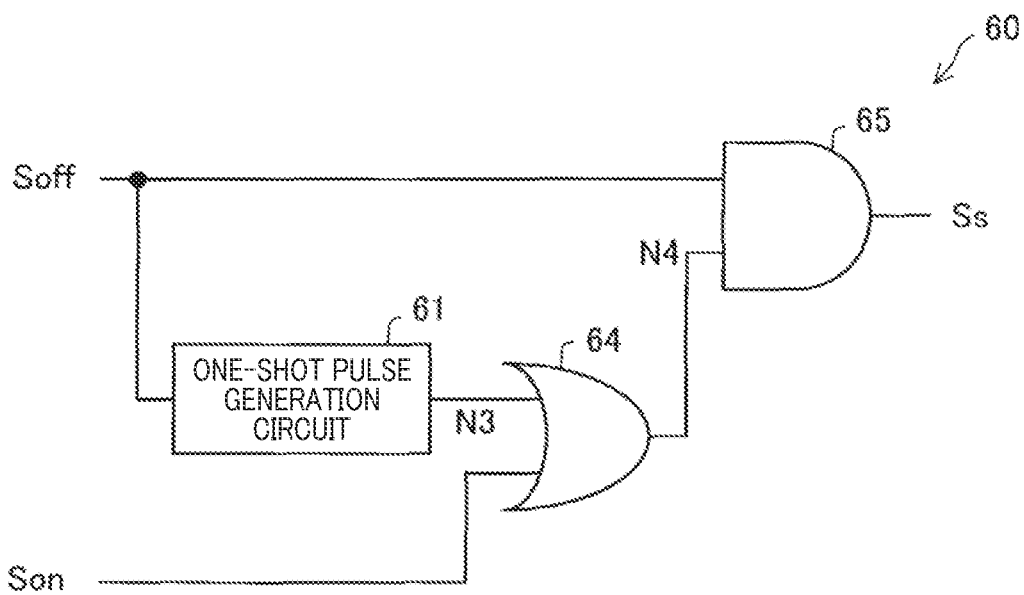
FIG. 8 is an explanatory diagram illustrating the configuration of a switching circuit.

FIG. 8 is an explanatory diagram illustrating the configuration of the switching circuit 60 shown in FIG. 2. The switching circuit 60 includes a one-shot pulse generation circuit 61, an OR circuit 64 and an AND circuit 65. The one-shot pulse generation circuit 61 generates, when the signal Soff transitions from [L] to [H], one pulse that transitions in the manner of [L]→[H]→[L]. When the signal Soff is kept at [H] or [L] and does not transition, or when the signal Soff transitions from [H] to [L], the one-shot pulse generation circuit 61 generates no pulse, keeping the output thereof at [L]. The OR circuit 64 outputs [H] when at least one of the output of the one-shot pulse generation circuit 61 and the signal Son is at [H]. The AND circuit 65 sets the switching signal Ss to [H] when both the signal Soff and the output of the OR circuit 64 are at [H], and sets the switching signal Ss to [L] when at least one of the signal Soff and the output of the OR circuit 64 is at [L].

Figure 9:
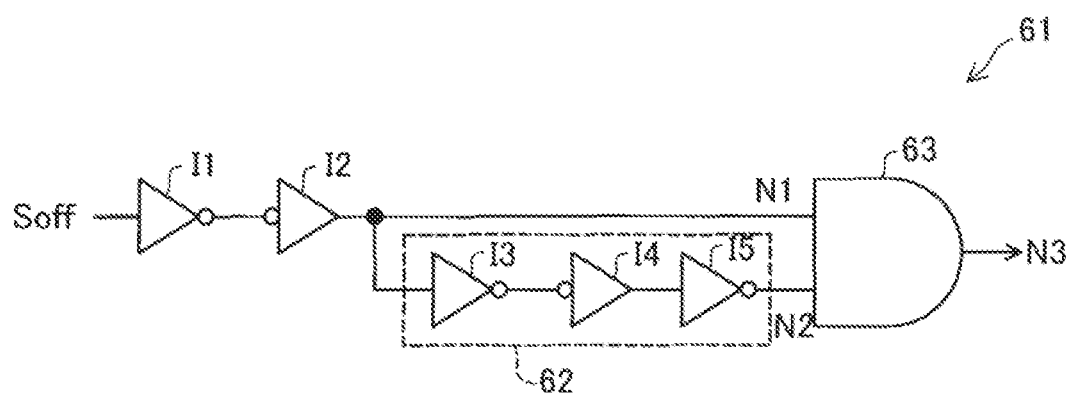
FIG. 9 is an explanatory diagram illustrating the configuration of a one-shot pulse generation circuit.

FIG. 9 is an explanatory diagram illustrating the configuration of the one-shot pulse generation circuit 61. The one-shot pulse generation circuit 61 includes inverters I1 and I2, a delay circuit 62, and an AND circuit 63. The inverters I1 and I2 are connected in series with each other; and the output of inverter I2 is inputted to both the AND circuit 63 and the delay circuit 62. The inverters I1 and I2 constitute a waveform shaping circuit. The signal Soff is inputted to only two circuits (i.e., the inverter I1 and the AND circuit 65), and the output of the inverter I2 is also inputted to only two circuits (i.e., the AND circuit 63 and the delay circuit 62); therefore, in the case of having the inverters I1 and I2, the total input capacitance is not higher and the waveform of the signal Soff is less likely to become dull than in the case of having no inverters I1 and I2. It should be noted that if the input capacitances of the two AND circuits 63 and 65 and the delay circuit 62 are low, the inverters I1 and I2 may be omitted.

The delay circuit 62 includes three inverters I3, I4 and I5 that are connected in series with each other. It should be noted that the number of inverters connected in series with each other may be other odd numbers, and may be set according to the width of the one-shot pulse. When the signal Soff is at [L], a node N1 representing the output of the inverter I2 is at [L] and a node N2 representing the output of the delay circuit 62 is at [H]. Moreover, when the signal Soff transitions from [L] to [H], the node N1 also transitions from [L] to [H]. In contrast, the node N2 transitions from [H] to [L] with a delay by a delay time of the delay circuit 62. Therefore, during a period whose length is equal to the delay time of the delay circuit 62, both the nodes N1 and N2 are at [H] and the one-shot pulse, which transitions in the manner of [L]→[H]→[L], is generated at a node N3 representing the output of the AND circuit 63. On the other hand, when the signal Soff at [H], the node N1 representing the output of the inverter I2 is at [H] and the node N2 representing the output of the delay circuit 62 is at [L]. Moreover, when the signal Soff transitions from [H] to [L], the node N1 also transitions from [H] to [L]. In contrast, the node N2 transitions from [L] to [H] with a delay by the delay time of the delay circuit 62. In this case, since there is no period during which both the nodes N1 and N2 are at [H], the node N3 representing the output of the AND circuit 63 is kept at [L]. That is, the one-shot pulse generation circuit 61 generates a pulse only when the signal Soff transitions from [L] to [H].

Figure 10:
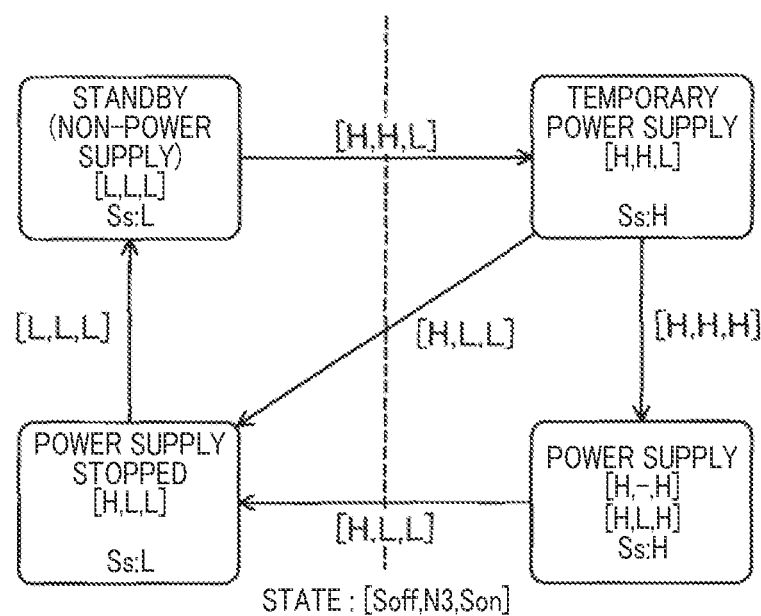
FIG. 10 is an explanatory diagram showing the states of signals in a standby (non-power supply) state, a temporary power supply state, a power supply state and a power supply stopped state of the power transmission circuit.

FIG. 10 is an explanatory diagram showing the states of signals in the standby (non-power supply) state, a temporary power supply state, the power supply state and a power supply stopped state of the power transmission circuit 40. In the standby (non-power supply) state, Vp<Vth_off_H and Vp<Vth_on_H; therefore, the states of [Soff, N3, Son] are [L, L, L] and thus the state of the signal Ss is [L]. In this state, when a transition occurs so that Vp>Vth_off_H, the state of the signal Soff becomes [H], the state of the node N3 also becomes [H], and thus the state of the signal Ss becomes [H]. Consequently, the state of the power transmission circuit 40 transitions from the standby state to the temporary power supply state.

In the temporary power supply state, during the period in which the state of the node N3 is [H], the state of the signal Ss becomes [H] due to the state of the node N3; thus, the voltage Vp of the power transmission coil 41 transitions from the trajectory of Voff to the trajectory of the Von. Further, when the voltage Vp of the power transmission coil 41 becomes higher than or equal to the threshold value Vth_on_H during the period in which the state of the node N3 is [H], the state of the signal Son becomes [H]; thus, the state of the signal Ss becomes [H] due to the state of the signal Son. As a result, the states of [Soff, N3, Son] become [H, H, H]; and the state of the power transmission circuit 40 transitions from the temporary power supply state to the power supply state.

On the other hand, in the temporary power supply state, if the voltage Vp of the power transmission coil 41 has not become higher than or equal to the threshold value Vth_on_H during the period in which the state of the node N3 is [H], the signal Son is kept at [L]; consequently, the state of the node N3 returns to [L] and thus the state of the signal Ss also returns to [L]. As a result, the states of [Soff, N3, Son] become [H, L, L]; and the state of the power transmission circuit 40 transitions from the temporary power supply state to the power supply stopped state.

In the power supply state in which the state of the signal Ss becomes [H] due to the state of the signal Son, Vp=Von>Vth_on_H>Vth_off_H; thus, the state of the signal Soff is [H]. Further, the state of the signal Ss is kept at [H] due to the state of the signal Son; therefore, the [H/L] of the node N3 becomes irrelevant to the power supply state in which the state of the signal Ss becomes [H] due to the state of the signal Son. Therefore, in the power supply state, the states of [Soff, N3, Son] are [H, -, H]. However, after the state of the node N3 returns to [L], it is kept at [L]; consequently, in the power supply state, the states of [Soff, N3, Son] become [H, L, H].

In the power supply state, as the power reception coil 241 moves away from the power transmission coil 41, the voltage Vp of the power transmission coil 41 becomes lower than the threshold value Vth_on_L. Further, upon the voltage Vp becoming lower than the threshold value Vth_on_L, the state of the signal Son becomes [L] and thus the state of the signal Ss also becomes [L]. Consequently, the state of the power transmission circuit 40 transitions from the power supply state to the power supply stopped state. In addition, the state of the node N3 is kept at [L] as described above.

In the power supply stopped state, as the power reception coil 241 moves further away from the power transmission coil 41, the voltage Vp of the power transmission coil 41 becomes lower than the threshold value Vth_off_L. Further, upon the voltage Vp becoming lower than the threshold value Vth_off_L, the state of the signal Soff becomes [L] and thus the state of the power transmission circuit 40 transitions from the power supply stopped state to the standby state. In the standby state, the states of [Soff, N3, Son] become [L, L, L] as described above.

Figure 11:
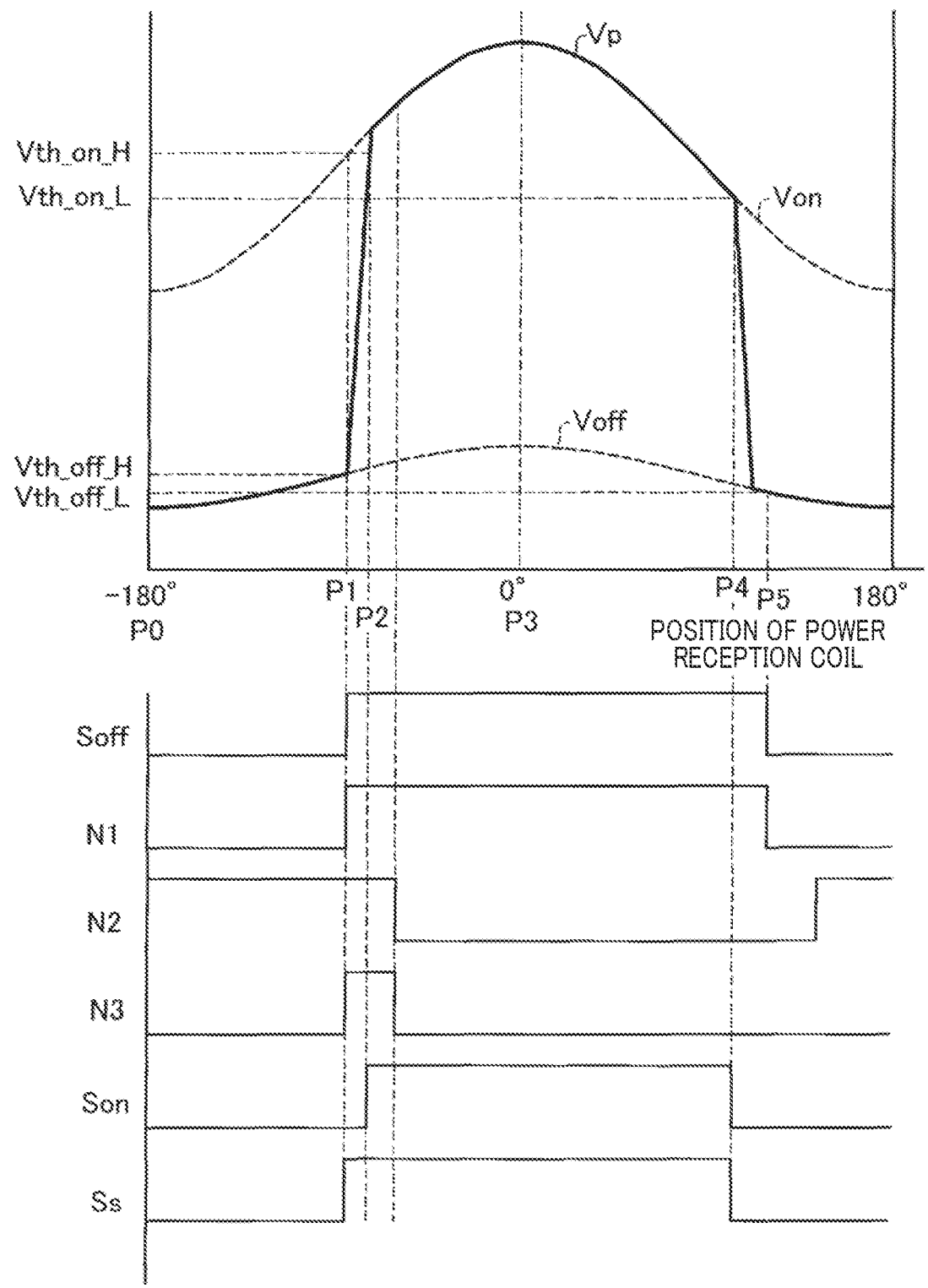
FIG. 11 is an explanatory diagram showing the trajectory of the voltage of the power transmission coil, which is the physical quantity, with movement of the power reception coil and the outputs of the signals.

FIG. 11 is an explanatory diagram showing the trajectory of the voltage Vp, which is the physical quantity, with movement of the power reception coil 241 and the outputs of the signals. When the power reception coil 241 is at a position P0 (i.e., the position of −180°, the switch SW1 is in the off-state; therefore, the power transmission circuit 40 is in the non-resonant state and the voltage Vp of the power transmission coil 41 is on the trajectory of the off-voltage Voff. When the power reception coil 241 approaches the power transmission coil 41 to reach a position P1, the voltage Vp of the power transmission coil 41 becomes higher than or equal to the threshold value Vth_off_H. Consequently, the state of the signal Soff becomes [H]; the state of the node N1 also becomes [H]; the state of the node N3 temporarily becomes [H]; thus, the state of the switching signal Ss becomes [H]. Moreover, the impedance of the power transmission circuit 40 is lowered; and the voltage Vp of the power transmission coil 41 transitions to the trajectory of the on-voltage Von after a transition period. In addition, upon the state of the signal Soff becoming [H], the threshold value is switched to Vth_off_L.

When the power reception coil 241 further approaches the power transmission coil 41 to reach a position P2 before the state of the node N3 returns to [L], the voltage Vp of the power transmission coil 41 becomes higher than or equal to the threshold value Vth_on_H. Consequently, the state of the signal Son becomes [H]; and the state of the switching signal Ss is kept at [H]. In addition, upon the state of the signal Son becoming [H], the threshold value is switched to Vth_on_L. Further, when the delay time of the delay circuit 62 has elapsed after the state of the signal Son becomes [H], the state of the node N2 transitions from [H] to [L]; thus, the state of the node N3 becomes [L]. In addition, if the state of the node N3 becomes [L] before the voltage Vp of the power transmission coil 41 becomes higher than or equal to the threshold value Vth_on_H, the state of the switching signal Ss will transition from [H] to [L] because the state of the signal Son has not become [H]; consequently, the voltage Vp of the power transmission coil 41 will return to the trajectory of the off-voltage Voff.

When the power reception coil 241 moves away from a position P3 (i.e., the position of 0°), where it is closest to the power transmission coil 41, to reach a position P4, the voltage Vp of the power transmission coil 41 becomes lower than the threshold value Vth_on_L. Consequently, the state of the signal Son becomes [L]; thus, the state of the switching signal Ss also becomes [L]. Moreover, the voltage Vp of the power transmission coil 41 transitions to the trajectory of the off-voltage Voff after a transition period. In addition, upon the state of the signal Son becoming [L], the threshold value is switched to Vth_on_H.

When the power reception coil 241 moves further away from the power transmission coil 41 to reach a position P5, the voltage Vp of the power transmission coil 41 becomes lower than the threshold value Vth_off_L. Consequently, the state of the signal Soff becomes [L]; thus, the threshold value is switched to Vth_off_H.

As described above, according to the first embodiment, the power-supply-side control unit 20 determines, by measuring the physical quantity of the power transmission coil 41 with the impedance of the power transmission circuit 40 set to a predetermined first impedance, whether the degree of resonance has become higher than or equal to the predetermined degree, i.e., whether the power reception coil 241 has approached the power transmission coil 41 to the extent that electric power can be supplied from the power transmission coil 41 to the power reception coil 241. Moreover, when the power reception coil 241 has approached the power transmission coil 41 to the extent that electric power can be supplied from the power transmission coil 41 to the power reception coil 241, the power-supply-side control unit 20 sets the impedance of the power transmission circuit 40 to a second impedance that is lower than the first impedance and thereby switches the power transmission circuit 40 to the second state, i.e., to the resonant state, thereby supplying electric power from the power transmission coil 41 to the power reception coil 241. On the other hand, when the power reception coil 241 has not approached the power transmission coil 41 to the extent that electric power can be supplied from the power transmission coil 41 to the power reception coil 241, the power-supply-side control unit 20 keeps the impedance of the power transmission circuit 40 at the first impedance and thus keeps the power transmission circuit 40 in the first state, i.e., in the non-resonant state, thereby suppressing the supply of electric power from the power transmission coil 41 to the power reception coil 241 to reduce the power supply loss. In this way, when the power reception coil 241 has approached the power transmission coil 41 to the extent that electric power can be supplied from the power transmission coil 41 to the power reception coil 241, the power-supply-side control unit 20 can efficiently supply electric power from the power transmission coil 41 to the power reception coil 241 by setting the impedance of the power transmission circuit 40 to the second impedance. Moreover, it is unnecessary to employ any communication apparatus for detecting the position of the power reception coil 241; and the power-supply-side control unit 20 can determine, based only on the power transmission system 100-side physical quantity, whether to perform or stop supply of electric power from the power transmission coil 41 to the power reception coil 241.

According to the first embodiment, the power transmission circuit 40 includes the power transmission coil 41, the plurality of capacitors 42 and 43, and the switch SW1 for connecting and disconnecting the capacitor 43. By turning on and off the switch SW1, the power-supply-side control unit 20 can easily change the impedance of the power transmission circuit 40 and thereby easily switch the power transmission circuit 40 between the resonant state and the non-resonant state. In addition, in the first embodiment, the number of capacitors connected to the power transmission circuit 40 is changed by the switch SW1. Alternatively, it is possible to change the impedance of the power transmission circuit 40 and switch the power transmission circuit 40 between the resonant state and the non-resonant state by employing a variable capacitance capacitor instead of the plurality of capacitors and varying the capacitance of the variable capacitance capacitor.

Figure 12:
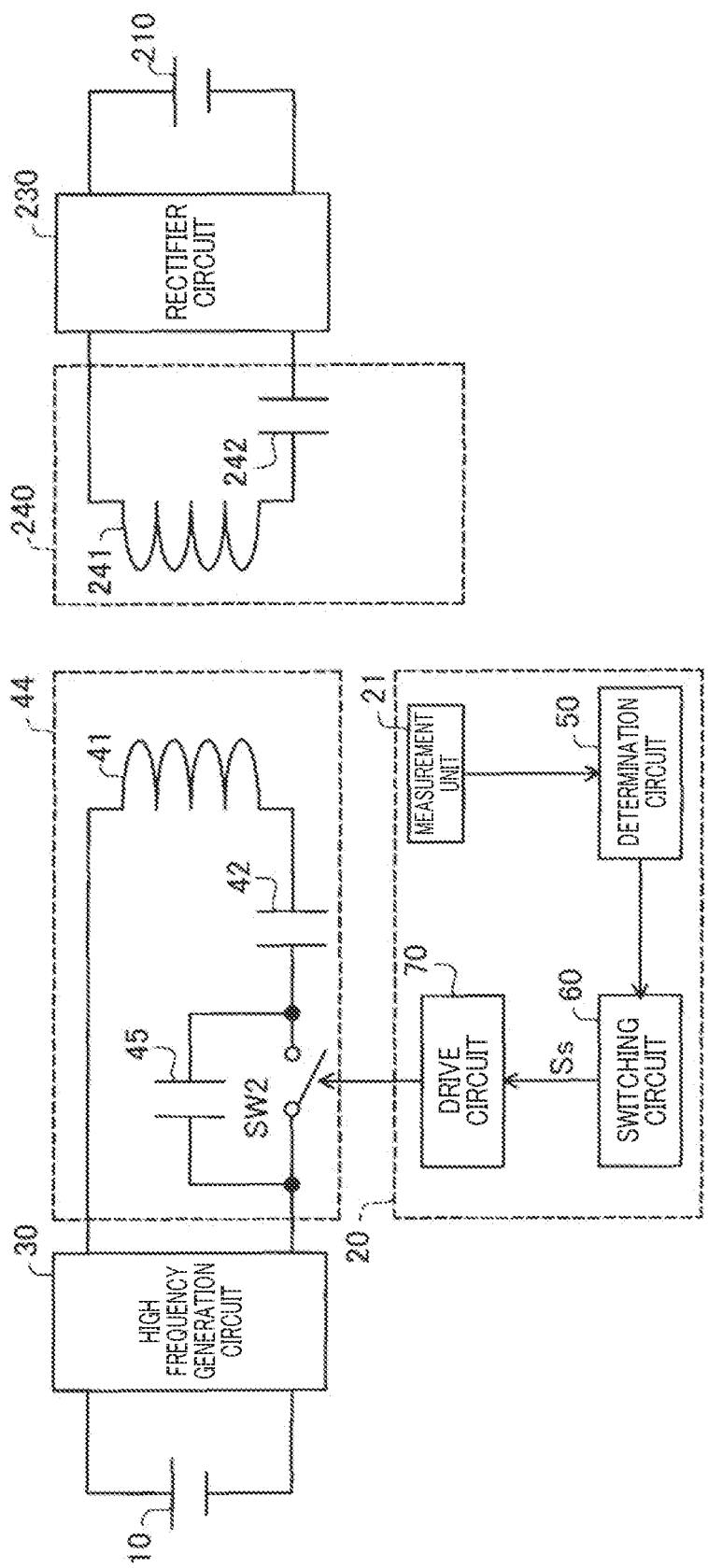
FIG. 12 is an explanatory diagram illustrating the configuration of a power transmission circuit according to a modification of the first embodiment.

FIG. 12 is an explanatory diagram illustrating the configuration of a power transmission circuit 44 according to a modification of the first embodiment. The power transmission circuit 44 includes a power transmission coil 41, a plurality of capacitors 42 and 45 that are connected in series with each other, and a switch SW2 provided on a path that directly connects the capacitor 42 and the high frequency generation circuit 30, bypassing the capacitor 45. With the above configuration, the power-supply-side control unit 20 can easily change the impedance of the power transmission circuit 44 by turning on and off the switch SW2, thereby easily switching the power transmission circuit 44 between a resonant state and a non-resonant state. When the switch SW2 is in an on-state, electric current from the high frequency generation circuit 30 is divided into electric current flowing through the capacitor 45 and electric current not flowing through the capacitor 45; consequently, the conduction loss of the switch SW2 can be reduced. In addition, in the case of employing a MOS-FET as the switch SW2, the capacitor 45 may be omitted by utilizing a parasitic capacitance of the MOS-FET.

In the first embodiment, in the non-resonant state, only the capacitor 42 is connected as a capacitor to the power transmission circuit 40; and in the resonant state, the capacitor 43 is further added to the power transmission circuit 40 by turning on the switch SW1. As an alternative, in the non-resonant state, both the capacitors 42 and 43 may be connected to the power transmission circuit 40; and in the resonant state, the capacitor 43 may be disconnected from the power transmission circuit 40 by a switch. As another alternative, the capacitors 42 and 43 may be switched by a switch so that: in the non-resonant state, only the capacitor 42 is connected to the power transmission circuit 40; and in the resonant state, only the capacitor 43 is connected to the power transmission circuit 40.

In the first embodiment, the power-supply-side control unit 20 switches the power transmission circuit 40 between the first state and the second state using the voltage of the power transmission coil 41 as the physical quantity. Alternatively, the power-supply-side control unit 20 may switch the power transmission circuit 40 from the first state to the second state using the voltage of the power transmission coil 41 as the physical quantity, and switch the power transmission circuit 40 from the second state to the first state using the voltage of the capacitor 43 as the physical quantity. That is, when the power transmission circuit 40 is in the second state, the power-supply-side control unit 20 may perform the switching of the power transmission circuit 40 from the second state to the first state using a physical quantity that is different from the physical quantity used for the switching of the power transmission circuit 40 from the first state to the second state.

In the first embodiment, as shown in FIGS. 5 and 6, in each of the first and second states of the power transmission circuit 40, the physical quantity becomes maximum when the power reception coil 241 and the power transmission coil 41 become closest to each other. The physical quantity may have a first value when the inter-coil distance between the power transmission coil 41 and the power reception coil 241 is a first distance, and have a second value which is greater than the first value when the inter-coil distance is a second distance which is shorter than the first distance. That is, the physical quantity becomes maximum when the inter-coil distance becomes shortest. Alternatively, it is possible to use a physical quantity such that it has a second value which is less than the first value when the inter-coil distance is a second distance which is shorter than the first distance. In this case, in each of the first and second states of the power transmission circuit 40, the physical quantity becomes minimum when the power reception coil 241 and the power transmission coil 41 become closest to each other.

Second Embodiment

Figure 13:
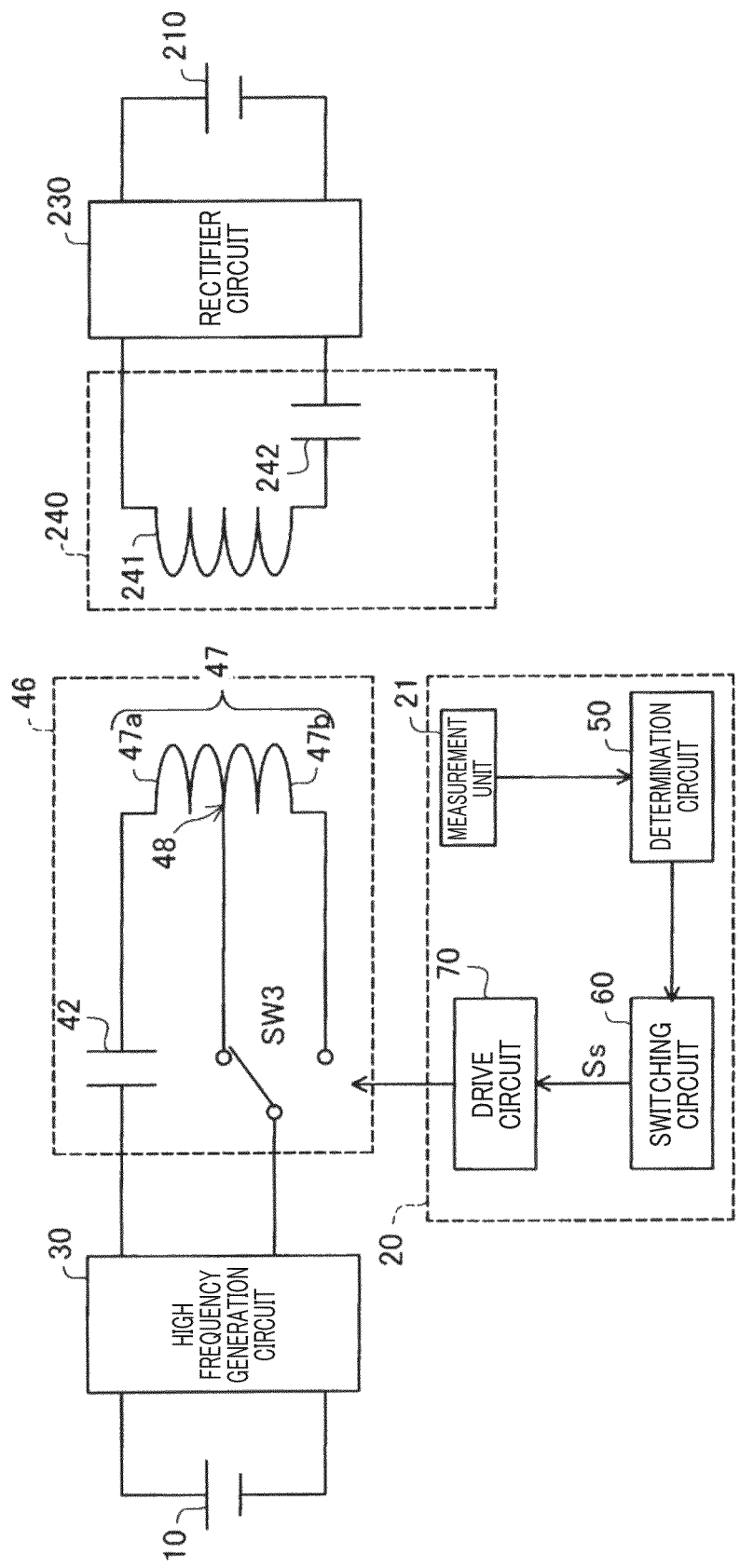
FIG. 13 is an explanatory diagram illustrating the configuration of a power transmission circuit according to a second embodiment.

FIG. 13 is an explanatory diagram illustrating the configuration of a power transmission circuit 46 according to the second embodiment. The power transmission circuit 46 includes a power transmission coil 47, a capacitor 42 and a switch SW3. The power transmission coil 47 can be divided into two power transmission coils 47a and 47b by a tap 48. When the switch SW3 is in a first state as shown in FIG. 13, the capacitor 42 and only the power transmission coil 47a of the power transmission coil 47 are connected in series with each other to the high frequency generation circuit 30. In contrast, when the switch SW3 is switched to the opposite side to the position thereof shown FIG. 13, the capacitor 42 and both the power transmission coils 47a and 47b of the power transmission coil 47 are connected in series with each other to the high frequency generation circuit 30. With the above configuration, the power-supply-side control unit 20 can easily change the impedance of the power transmission circuit 46 by turning on and off the switch SW3, thereby easily switching the power transmission circuit 46 between a resonant state and a non-resonant state.

As described above, according to the second embodiment, the power transmission coil 47 has the tap 48 connectable to the power transmission circuit 46; and the power-supply-side control unit 20 can change the inductance of the power transmission coil 47 by turning on and off the switch SW3, thereby switching the power transmission circuit 46 between the resonant state and the non-resonant state.

In addition, in the second embodiment, the power transmission coil 47 is divided into the two power transmission coils 47a and 47b by the tap 48; and whether to add the power transmission coil 47b in series to the power transmission coil 47a is controlled by the switch SW3. As an alternative, a serially-connected unit of a power transmission coil and a switch may be provided in parallel to the power transmission coil 47. In this case, by turning on and off the switch, it is possible for the power-supply-side control unit 20 to connect the power transmission coil, which is connected in series with the switch, in parallel to the power transmission coil 47 or disconnect the power transmission coil from the power transmission coil 47, thereby changing the total inductance of the power transmission coils, changing the impedance of the power transmission circuit 46 and switching the power transmission circuit 46 between the resonant state and the non-resonant state. As another alternative, two power transmission coils may be connected in parallel to each other; and one of the two power transmission coils may be selected by a switch and connected to the power transmission circuit 46.

In the above-described embodiments, the voltage between both ends of the power transmission coil 41 is used as the physical quantity. However, the electric current flowing through the power transmission coil 41 or the magnetic flux generated by the power transmission coil 41 may alternatively be used as the physical quantity. Moreover, for example, a Hall-effect sensor, an MR sensor or an MI sensor may be employed as a sensor for detecting the magnetic flux. In the case of employing a sensor for detecting the magnetic flux, it is possible to achieve an advantageous effect such that measurement of the magnetic flux does not affect the voltage or current of the power transmission coil 41.

Third Embodiment

As described above with reference to FIG. 10, in the standby (non-power supply) state, Vp<Vth_off_H and Vp<Vth_on_H; therefore, the states of [Soff, N3, Son] are [L, L, L] and thus the state of the signal Ss is [L]. In this state, when a transition occurs so that Vp≥Vth_off_H, as shown in FIG. 8, the state of the signal Soff transitions from [L] to [H] so that the state of the node N3 becomes [H] and thus the state of the signal Ss also becomes [H]. Consequently, the state of the power transmission circuit 40 transitions from the standby state to the temporary power supply state. If the state of the signal Son becomes [H] during the temporary power supply period, the state of the signal Ss is kept at [H]. However, in the power supply stopped state, the state of the signal Son becomes [L] with the state of the signal Soff kept at [H]; thus, the state of the signal Ss also becomes [L]. Therefore, when the vehicle 202 approaches again the power transmission system 100 in the power supply stopped state before the state of the signal Soff transitions to [L], no transition of the state of the signal Soff from [L] to [H] occurs; thus, no pulse transitioning in the manner of [L]→[H]→[L] is generated at the node N3 shown in FIG. 8. Consequently, the state of the signal Ss is kept at [L]; thus, the state of the power transmission circuit 40 cannot transition to the temporary power supply state or the power supply state. The third embodiment provides a configuration for solving this problem. In addition, in the standby state, the state of the signal Soff is [L]; therefore, this problem does not occur.

Figure 14:
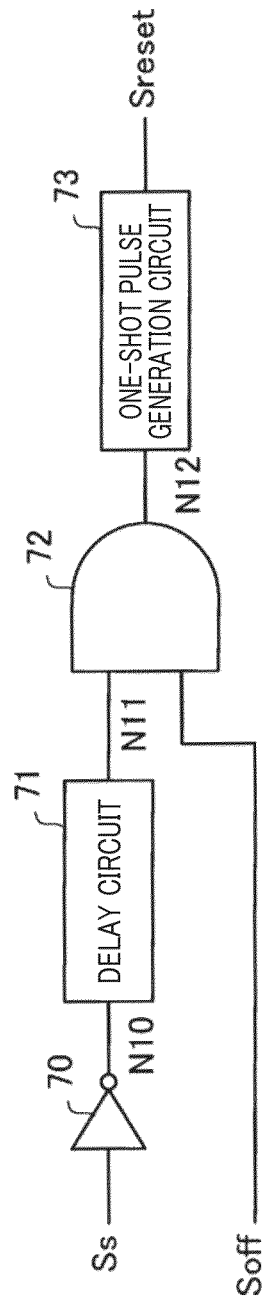
FIG. 14 is an explanatory diagram illustrating the configuration of a reset signal generation circuit.

A reset signal generation circuit shown in FIG. 14 includes an inverter 70, a delay circuit 71, an AND circuit 72 and a one-shot pulse generation circuit 73. The inverter 70 inverts the [H] and [L] of the signal Ss and outputs the result of the inversion to a node N10. The delay circuit 71 delays the signal at the node N10 and outputs the delayed signal to a node N11. The AND circuit 72 outputs [H] to a node N12 when both the node N11 and the signal Soff are at [H]. The one-shot pulse generation circuit 73 has the same configuration as the one-shot pulse generation circuit 61 shown in FIG. 9. When the node N12 transitions from [L] to [H], the one-shot pulse generation circuit 73 generates one pulse that transitions in the manner of [L]→[H]→[L].

When the signal Ss is at [H], the node N11 is at [L]; thus, the node N12 representing the output of the AND circuit 72 is also at [L]. Then, as the vehicle 202 moves away from the power transmission system 100, as shown in FIG. 11, the state of the signal Ss transitions from [H] to [L] earlier than the state of the signal Soff does. Upon the transition of the state of the signal Ss from [H] to [L], the inverter 70 and the delay circuit 71 cause the state of the node N11 to transition from [L] to [H] after a certain delay time from the transition of the state of the signal Ss. The delay time is set by the delay circuit 71 to be shorter than the length of time from when the state of the signal Ss transitions from [H] to [L] until the state of the signal Soff transitions from [H] to [L]. Therefore, there occurs a period in which both the node N11 and the signal Soff are at [H]. Consequently, the state of the node N12 representing the output of the AND circuit 72 temporarily transitions from [L] to [H]. A reset signal Sreset generated by the one-shot pulse generation circuit 73 is normally at [L]. When the node N12 transitions from [L] to [H], the one-shot pulse generation circuit 73 generates one pulse that transitions in the manner of [L]→[H]→[L].

Figure 15:
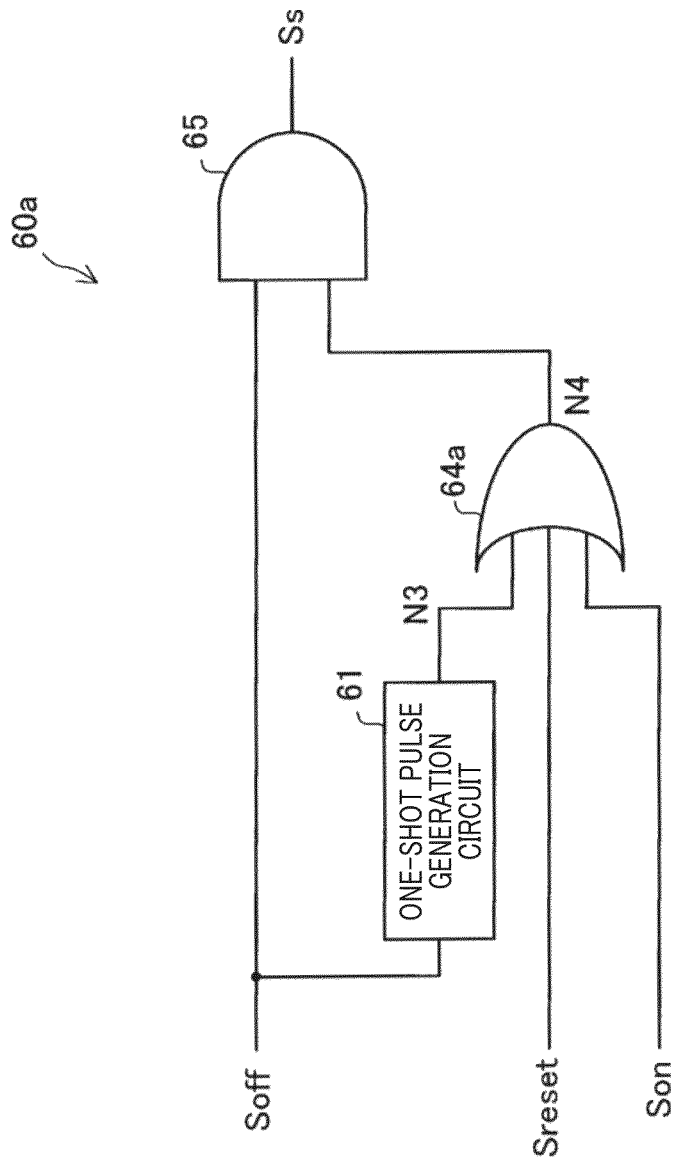
FIG. 15 is an explanatory diagram illustrating the configuration of a switching circuit according to a third embodiment.

A switching circuit 60a shown in FIG. 15 differs from the switching circuit 60 of the first embodiment shown in FIG. 8 in that: an OR circuit 64a of the switching circuit 60a is a three-input OR circuit; and the reset signal Sreset is further inputted to the OR circuit 64a. In the switching circuit 60 of the first embodiment shown in FIG. 8, the signal Ss is set to [H] when the signal Soff is at [H] or the signal Son is at [H]. In contrast, in the switching circuit 60a of the third embodiment shown in FIG. 15, the signal Ss is set to [H] when the signal Soff is at [H], the signal Son is at [H] or the reset signal Sreset is at [H]. Therefore, during the period in which the reset signal Sreset is at [H], in other words, during a certain period of time after the transition of the state of the signal Ss from [H] to [L], the signal Ss is reset to [H] and thus the state of the power transmission circuit 40 transitions to the temporary power supply state. Further, if the state of the signal Son becomes [H] during the period in which the state of the signal Ss becomes [H] again, the state of the power transmission circuit 40 will transition from the temporary power supply state to the power supply state in which the signal Ss is kept at [H].

Figure 16:
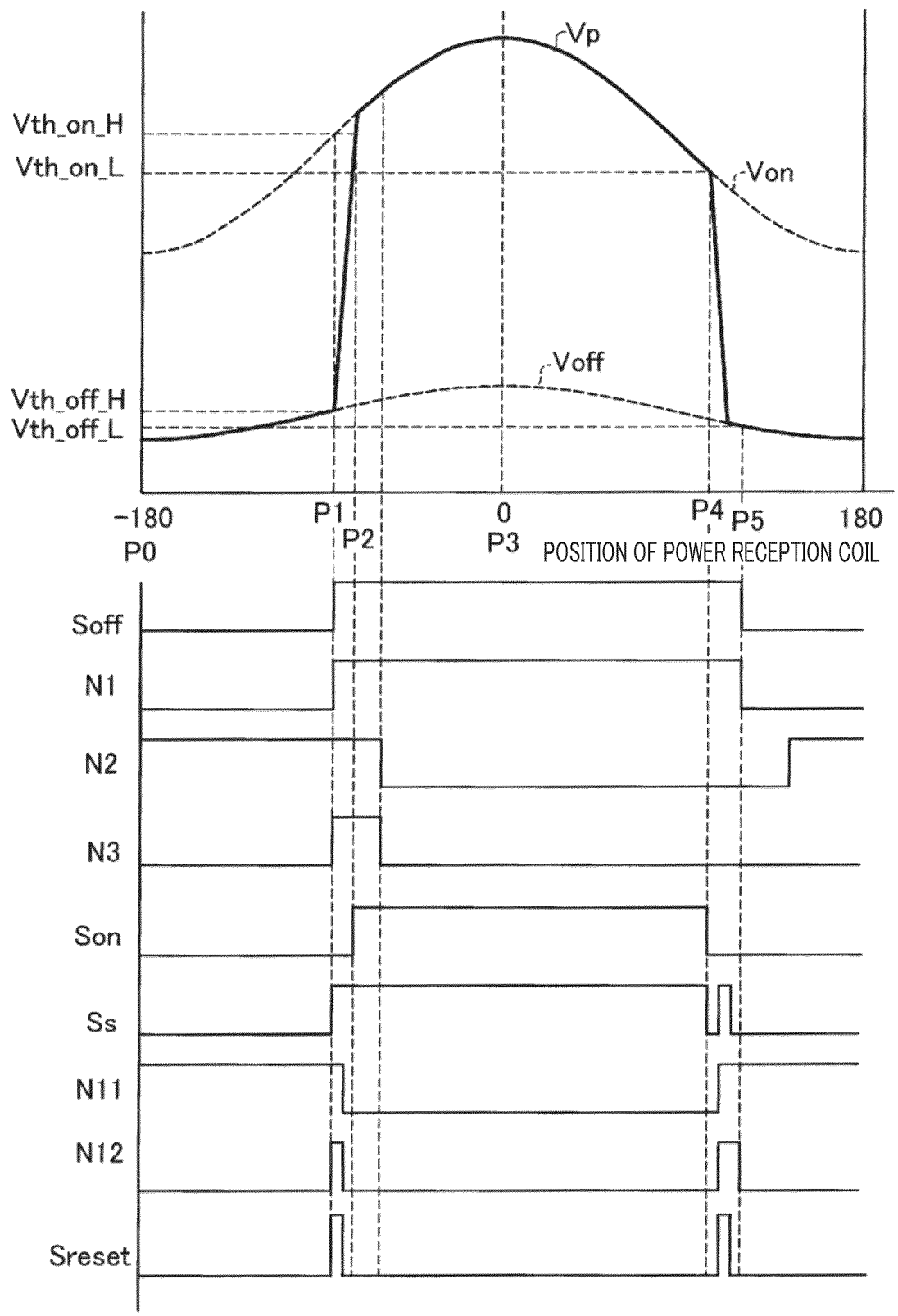
FIG. 16 is an explanatory diagram showing the outputs of signals in the third embodiment.

FIG. 16 is an explanatory diagram showing the outputs of signals in the third embodiment. Compared to the outputs of the signals in the first embodiment shown in FIG. 11, the outputs of the signals at the nodes N11 and N12 and the signal Sreset are further added in the third embodiment. The signal at the node N11 is a signal whose [H] and [L] are inverted as compared with the signal Ss and which is delayed from the signal Ss by the delay time of the delay circuit 71. Upon the state of the node N11 becoming [H], the state of the node N12 also becomes [H] and is kept at [H] only for the period in which the signal Soff is at [H]. Upon the state of the node N12 transitioning from [L] to [H], the one-shot pulse generation circuit 73 shown in FIG. 14 generates the pulse signal Sreset that transitions in the manner of [L]→[H]→[L]. In addition, in the example shown in FIG. 16, the state of the signal Soff transitions to [L] after the state of the signal Sreset transitions from [H] to [L]; and the state of the signal Sreset is kept at [H] for the period determined by the delay circuit 62 of the one-shot pulse generation circuit 73. In contrast, in the case of the state of the signal Soff transitioning to [L] earlier than the period determined by the delay circuit 62 of the one-shot pulse generation circuit 73, the state of the signal Sreset becomes [L] at the same time as the state of the signal Soff.

As described above, according to the third embodiment, after the power transmission circuit 40 is switched from the resonant state to the non-resonant state and brought into the power supply stopped state, the power-supply-side control unit 20 restores the power transmission circuit 40 to the temporary power supply state for a certain period of time by temporarily setting the state of the signal Ss to [H] using the pulse signal Sreset. Consequently, when the vehicle 202 approaches again the power transmission system 100 after it moved away from the power transmission system 100 and the power transmission circuit 40 has been temporarily restored to the temporary power supply state, the power-supply-side control unit 20 can switch the power transmission circuit 40 from the temporary power supply state to the power supply state. In addition, if no vehicle 202 approaches the power transmission system 100 during the period in which the power transmission circuit 40 is in the temporary power supply state, both the states of the signals Sreset and Soff transition to [L] and the power transmission circuit 40 is switched to the standby state. As a result, when the vehicle 202 approaches again the power transmission system 100 and thus the voltage Vp of the power transmission coil 41 becomes high, the power-supply-side control unit 20 can switch the power transmission circuit 40 from the standby state to the power supply state through the temporary power supply state, as described in the first embodiment.

Fourth Embodiment

Figure 17:
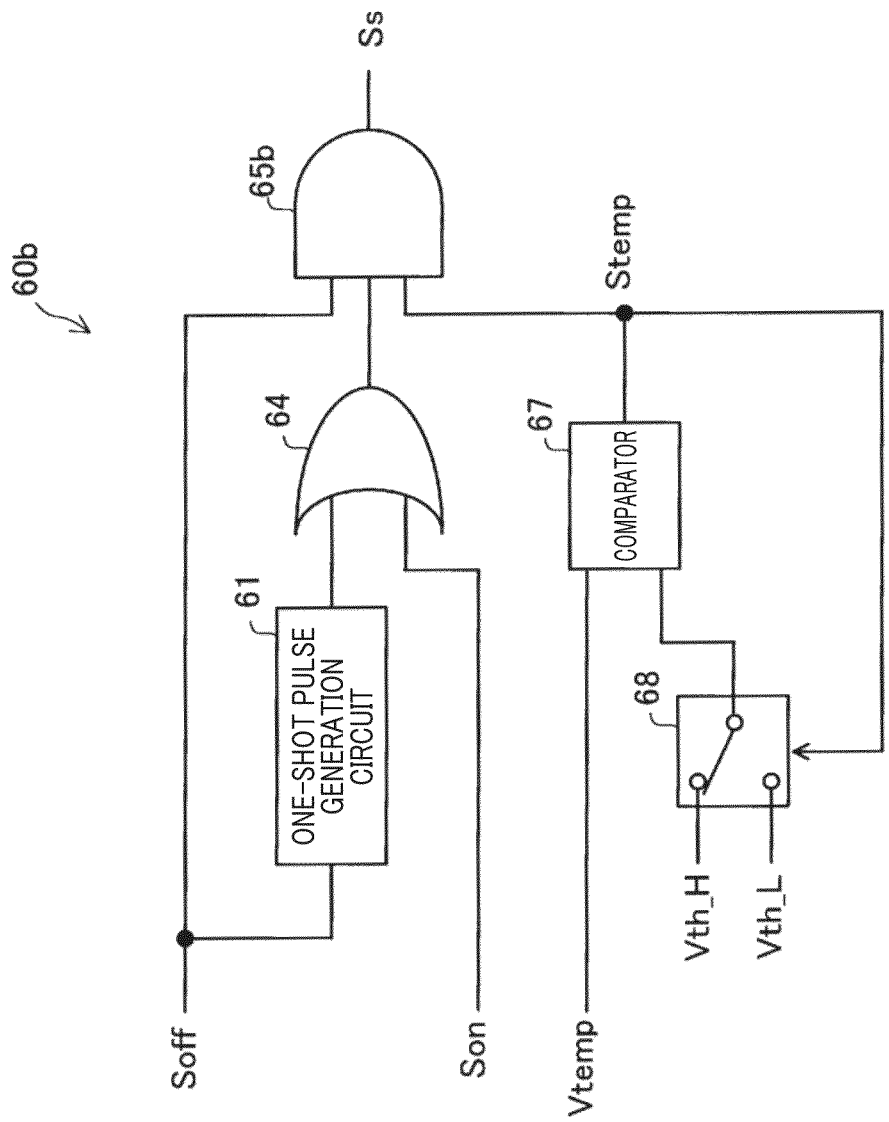
FIG. 17 is an explanatory diagram illustrating the configuration of a switching circuit according to a fourth embodiment.

In the first embodiment, the temperature of the power transmission system 100 is not considered. In contrast, in the fourth embodiment, when the temperature of the power transmission system 100 becomes higher than or equal to a threshold value, the signal Ss is set to [L], thereby setting the power transmission circuit 40 to the non-resonant state even if it is in the resonant state. Consequently, the electric current flowing through the power transmission circuit 40 is reduced, thereby lowering the temperature of the power transmission system 100. As shown in FIG. 17, a switching circuit 60b of the fourth embodiment includes an AND circuit 65b that is a 3-input AND circuit to which a signal Stemp is further inputted. The AND circuit 65b is different from the AND circuit 65 of the first embodiment which is a two-input AND circuit. The signal Stemp is a signal whose state becomes [H] when the temperature Tc of the power transmission system 100 becomes lower than the threshold value, and becomes [L] when the temperature Tc becomes higher than or equal to the threshold value. In practice, a voltage Vtemp is generated according to the temperature Tc of the power transmission system 100 by a temperature sensor; and the voltage Vtemp is compared with a threshold value by a comparator 67. Moreover, in the present embodiment, in order to suppress chattering, two threshold values are prepared: Vth_H corresponding to a temperature Th; and Vth_L corresponding to a temperature Tl lower than the temperature Th. By a changeover circuit 68, when the signal Stemp is at [H], Vth_H is selected as the threshold value; and when the signal Stemp is at [L], Vth_L is selected as the threshold value. In addition, Vth_H is a voltage higher than Vth_L. When the signal Stemp is at [H], upon the temperature Tc of the power transmission system 100 having increased to become higher than or equal to the temperature Th, Vtemp becomes higher than or equal to the threshold value Vth_H so that the state of the signal Stemp becomes [L] and thus the state of the signal Ss also becomes [L]. As a result, the power transmission circuit 40 is set to the non-resonant state even if it is in the resonant state. In addition, upon the state of the signal Stemp becoming [L]; the threshold value is switched to Vth_L by the changeover circuit 68. However, since Vtemp>Vth_H>Vth_L, the state of the signal Stemp is kept at [L]. Further, upon the power transmission circuit 40 being set to the non-resonant state, the electric current flowing through the power transmission circuit 40 is reduced and thus the temperature Tc of the power transmission circuit 40 is also lowered. Furthermore, upon the temperature Tc of the power transmission system 100 having been lowered to become lower than the temperature Tl, Vtemp becomes lower than the threshold value Vth_L so that the state of the signal Stemp becomes [H]. In addition, upon the state of the signal Stemp becoming [H], the threshold value is switched to Vth_H by the changeover circuit 68. However, since Vtemp<Vth_L<Vth_H, the state of the signal Stemp is kept unchanged at [H].

Figure 18:
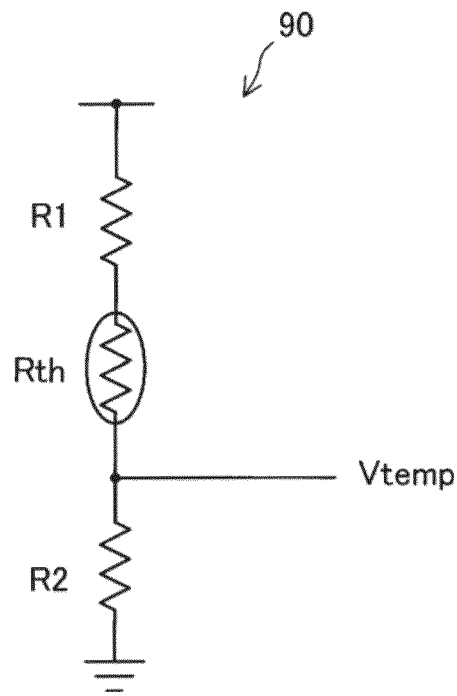
FIG. 18 is an explanatory diagram illustrating the configuration of a Vtemp generation circuit.

FIG. 18 is an explanatory diagram illustrating the configuration of a Vtemp generation circuit 90. The Vtemp generation circuit 90 includes three electrical resistors R1, Rth and R2 that are serially connected in this order from a power supply to the ground. The electrical resistors R1 and R2 are electrical resistors having low temperature dependence, whereas the electrical resistor Rth is a thermistor, i.e., an electrical resistor having high temperature dependence. The electrical resistor Rth has a characteristic such that its electrical resistance decreases with increase in its temperature. Therefore, with increase in the temperature Tc, the voltage Vtemp at an intermediate node between the electrical resistors RTh and R2 also increases. It should be noted that an electrical resistor whose electrical resistance increases with increase in its temperature may alternatively be employed. as the electrical resistor Rth. In this case, Vtemp may be taken out from an intermediate node between the electrical resistors R1 and Rth.

Figure 19:
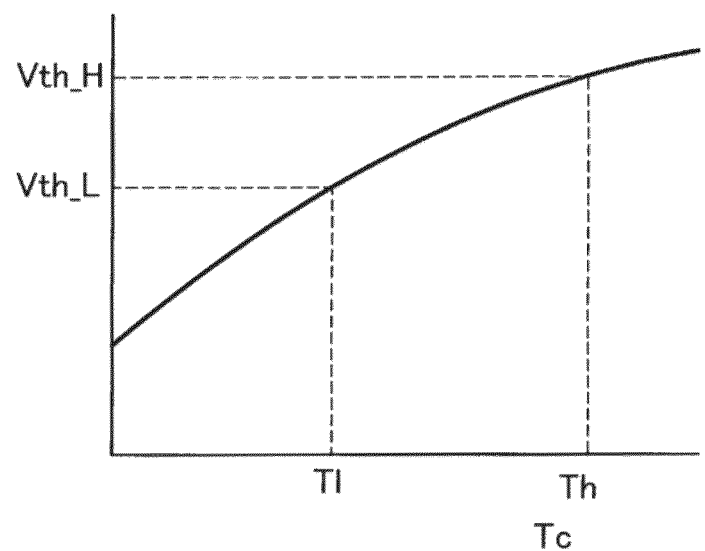
FIG. 19 is a graph illustrating the relationship between temperature and voltage.

FIG. 19 is a graph illustrating the relationship between the temperature Tc and the voltage Vtemp. The voltage Vtemp becomes equal to the threshold value Vth_H when the temperature Tc is the temperature Th, and becomes equal to the threshold value Vth_L when the temperature Tc is the temperature Tl.

As described above, according to the fourth embodiment, upon the temperature Tc of the power transmission system 100 becoming higher than or equal to the temperature Th, the voltage Vtemp becomes higher than or equal to the threshold value Vth_H; thus, the state of the signal Sad becomes [L] and the power transmission circuit 40 is set to the non-resonant state even if it is in the resonant state. Thereafter, upon the temperature Tc of the power transmission system 100 becoming lower than the temperature Tl, Vtemp becomes lower than the threshold value Vth_L; thus, the state of the signal Stemp becomes [H]. As a result, the power transmission circuit 40 can be switched to the resonant state if other conditions are satisfied.

Fifth Embodiment

Figure 20:
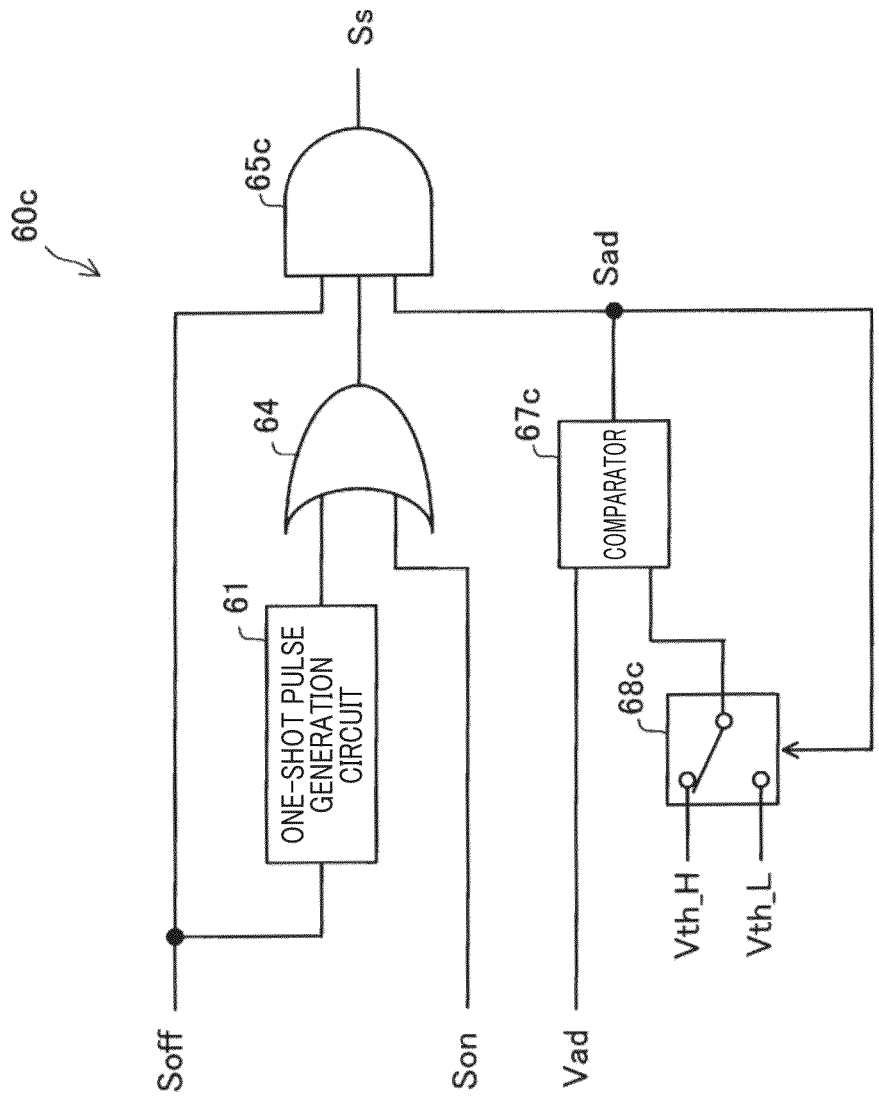
FIG. 20 is an explanatory diagram illustrating the configuration of a switching circuit according to a fifth embodiment.

As shown in FIG. 20, a switching circuit 60c of the fifth embodiment includes an AND circuit 65c that is a 3-input AND circuit to which a signal Sad is further inputted. The AND circuit 65c is different from the AND circuit 65 of the first embodiment which is a two-input AND circuit. Moreover, the switching circuit 60c of the fifth embodiment is identical to the switching circuit 60b of the fourth embodiment shown in FIG. 17 except that the signal Sad is inputted, instead of the signal Stemp, to the AND circuit 65c.

The signal Sad is a signal whose state becomes [H] when the electric current flowing through the power transmission circuit 40 becomes lower than a threshold value, and becomes [L] when the electric current becomes higher than or equal to the threshold value. Therefore, when the electric current Iad flowing through the power transmission circuit 40 becomes an overcurrent higher than or equal to the threshold value, the power transmission circuit 40 is set to the non-resonant state even if it is in the resonant state. Moreover, in the present embodiment, in order to suppress chattering, two threshold values are prepared: Vth_H corresponding to a current value Ih; and Vth_L corresponding to a current value Il lower than the current value Ih. By a changeover circuit 68c, when the signal Sad is at [H], Vth_H is selected as the threshold value; and when the signal Sad is at [L], Vth_L is selected as the threshold value. In addition, Vth_H is a voltage higher than Vth_L. The voltage Vad is a voltage corresponding to the electric current Iad flowing through the power transmission circuit 40, and is used for comparison with the threshold value (i.e., Vth_H or Vth_L). When the signal Sad is at [H], upon the electric current Iad having increased to become higher than or equal to the current value Ih, the voltage Vad corresponding to the electric current Iad becomes higher than or equal to the threshold value Vth_H so that the state of the signal Sad becomes [L] and thus the state of the signal Ss also becomes [L]. As a result, the power transmission circuit 40 is set to the non-resonant state even if it is in the resonant state. In addition, upon the state of the signal Sad becoming [L], the threshold value is switched to Vth_L by the changeover circuit 68c. However, since Vad>Vth_H>Vth_L, the state of the signal Sad is kept at [L]. Further, upon the power transmission circuit 40 being set to the non-resonant state, the electric current Iad flowing through the power transmission circuit 40 is reduced. Furthermore, upon the electric current Iad having been reduced to become lower than the current value Il, Vad becomes lower than the threshold value Vth_L so that the state of the signal Sad becomes [H]. In addition, upon the state of the signal Sad becoming [H], the threshold value is switched to Vth_H by the changeover circuit 68c. However, since Vad<Vth_L<Vth_H, the state of the signal Sad is kept unchanged at [H].

As described above, according to the fifth embodiment, upon the electric current Iad becoming higher than or equal to Ih, the voltage Vad becomes higher than or equal to the threshold value Vth_H; thus, the state of the signal Sad becomes [L] and the power transmission circuit 40 is set to the non-resonant state even if it is in the resonant state. Thereafter, upon the electric current Iad becoming lower than Il, the voltage Vad becomes lower than the threshold value Vth_L; thus, the state of the signal Sad becomes [H]. As a result, the power transmission circuit 40 can be set to the resonant state if other conditions are satisfied.

Sixth Embodiment

Figure 21:
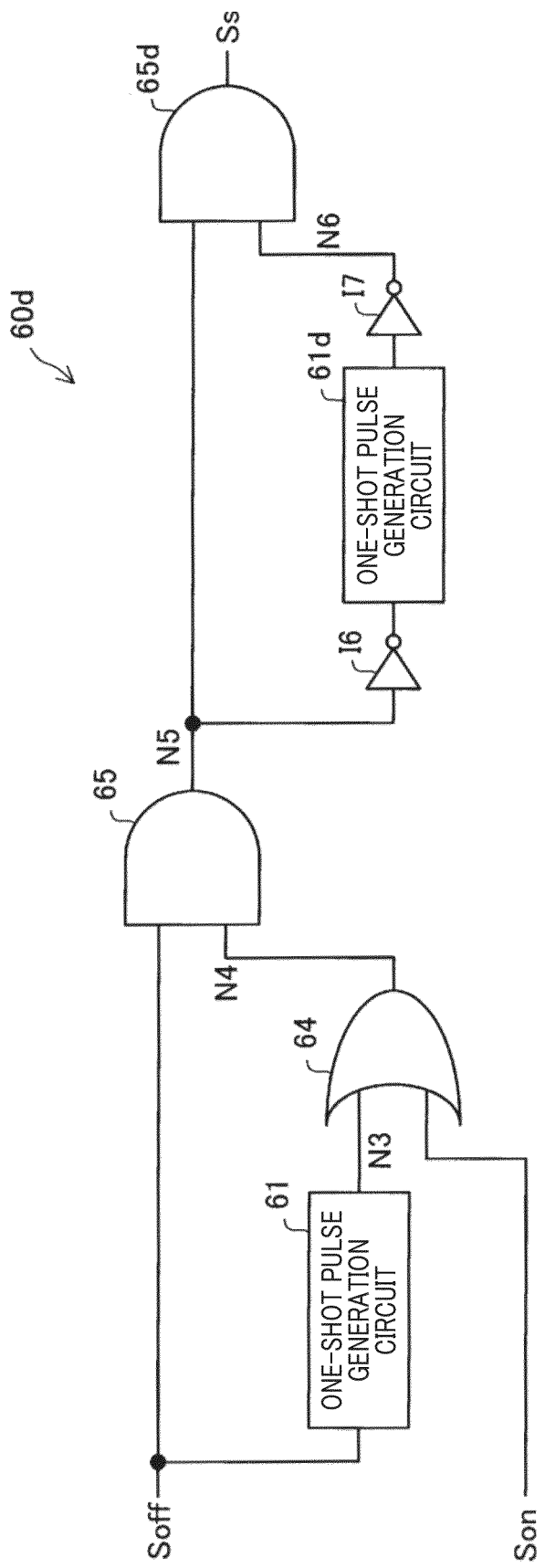
FIG. 21 is an explanatory diagram illustrating the configuration of a switching circuit according to a sixth embodiment.

In the sixth embodiment, after switching the state of the power transmission circuit 40 from the resonant state to the non-resonant state, the power-supply-side control unit 20 keeps the state of the power transmission circuit 40 in the non-resonant state for an off-keeping time (Toff_prsv) even if it is possible to switch the state of the power transmission circuit 40 from the non-resonant state to the resonant state. FIG. 21 is an explanatory diagram illustrating the configuration of a switching circuit 60d of the sixth embodiment. The switching circuit 60d of the sixth embodiment differs from the switching circuit 60 of the first embodiment described with reference to FIG. 8 in that an AND circuit 65d is arranged after the AND circuit 65. The output of the AND circuit 65 is inputted not only to a first input node of the AND circuit 65d, but also to a second input node of the AND circuit 65d via an inverter I6, a one-shot pulse generation circuit 61d and an inverter I7. The one-shot pulse generation circuit 61d generates, when its input rises from [L] to [H], one pulse that transitions in the manner of [L]→[H]→[L]. That is, when the state of an output node 5 of the AND circuit 65 falls from [H] to [L], the one-shot pulse generation circuit 61d generates one pulse that transitions in the manner of [L]→[H]→[L]. The second input node N6 of the AND circuit 65d is normally at [H]. When the state of the output node N5 of the AND circuit 65 falls from [H] to [L], the state of the second input node N6 of the AND circuit 65d becomes [L] and is kept at [L] only for a certain period of time, which is determined by the one-shot pulse generation circuit 61d, after the falling of the state of the output node N5 from [H] to [L].

Figure 22:
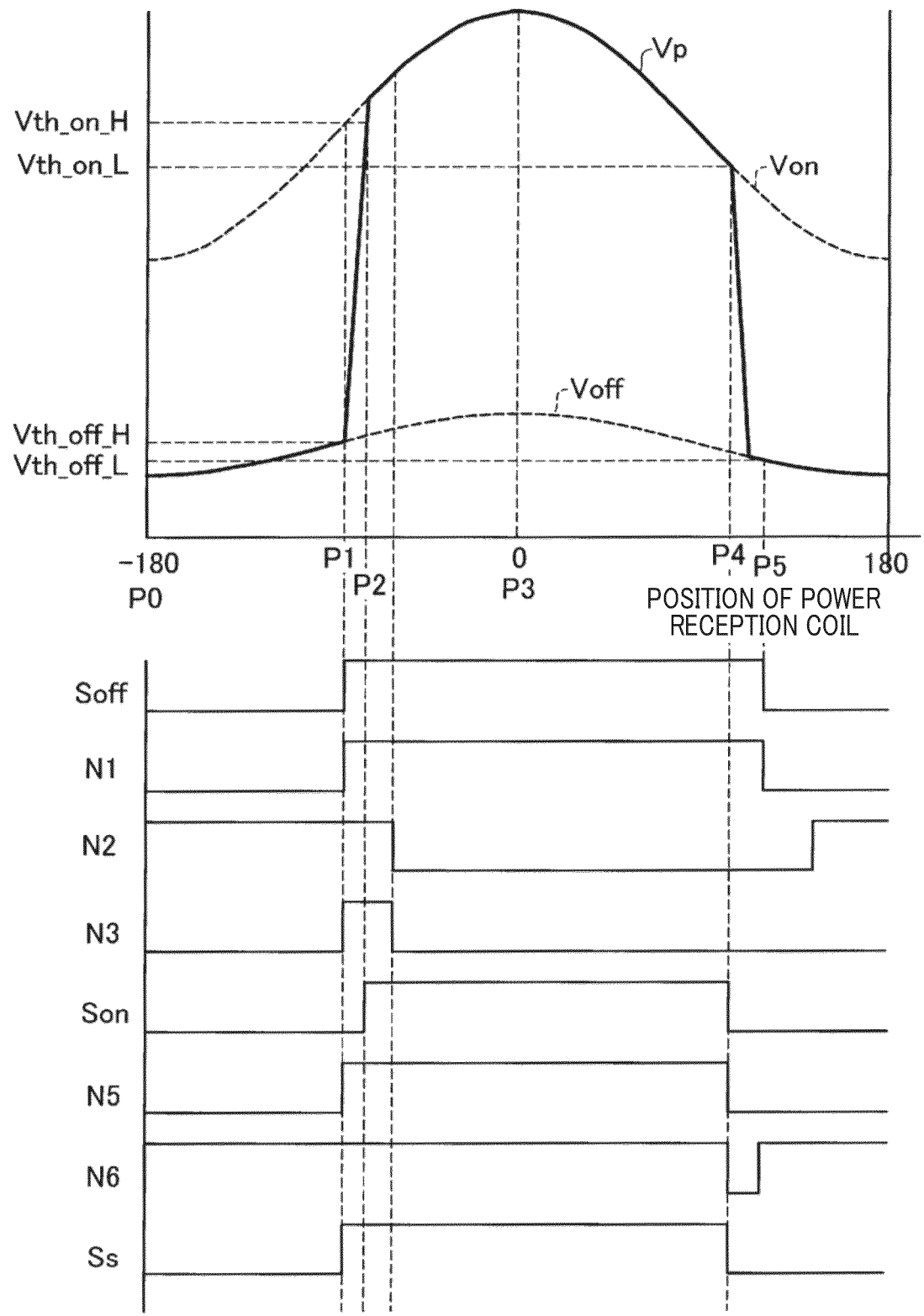
FIG. 22 is an explanatory diagram showing the trajectory of the voltage of the power transmission coil, which is the physical quantity, with movement of the power reception coil and the outputs of signals in the switching circuit according to the sixth embodiment.

FIG. 22 is an explanatory diagram showing the trajectory of the voltage Vp, which is the physical quantity, with movement of the power reception coil 241 and the outputs of signals in the switching circuit 60d. The waveforms shown in FIG. 22 are identical to those in the first embodiment shown in FIG. 11 except that the signals at the nodes N5 and N6 shown in FIG. 21 are added to FIG. 22. In the first embodiment shown in FIG. 11, when the power reception coil 241 moves away from the power transmission coil 41 so that the voltage Vp of the power transmission coil 41 becomes lower than the threshold value Vth_on_L, the power-supply-side control unit 20 switches the power transmission circuit 40 to the non-resonant state, thereby stopping the supply of electric power from the power transmission coil 41 to the power reception coil 241. On the other hand, when the power reception coil 241 approaches the power transmission coil 41 so that the voltage Vp of the power transmission coil 41 becomes higher than or equal to the threshold value Vth_off_H, the power-supply-side control unit 20 switches the power transmission circuit 40 to the resonant state, thereby supplying electric power from the power transmission coil 41 to the power reception coil 241.

In contrast, in the sixth embodiment, when having switched the power transmission circuit 40 from the resonant state to the non-resonant state, the power-supply-side control unit 20 keeps the state of the power transmission circuit 40 in the non-resonant state for the certain period of time determined by the one-shot pulse generation circuit 61d, even if the power reception coil 241 approaches the power transmission coil 41 so that the voltage Vp of the power transmission coil 41 becomes higher than or equal to the threshold value Vth_off_H. In the resonant state, the temperature of the power transmission circuit 40 increases due to the supply of electric power from the power transmission coil 41 to the power reception coil 241. This temperature increase may affect physical quantities of the power transmission circuit 40, such as the voltage and current of the power transmission coil 41. In the sixth embodiment, after the state of the power transmission circuit 40 is switched from the resonant state to the non-resonant state, the non-resonant state is maintained for the off-keeping time (Toff_prsv). As a result, it becomes possible to cool down the power transmission circuit 40, thereby preventing erroneous determination of the switching of the power transmission circuit 40 between the non-resonant state and the resonant state and thus occurrence of chattering.

Modification of Sixth Embodiment

Figure 23:
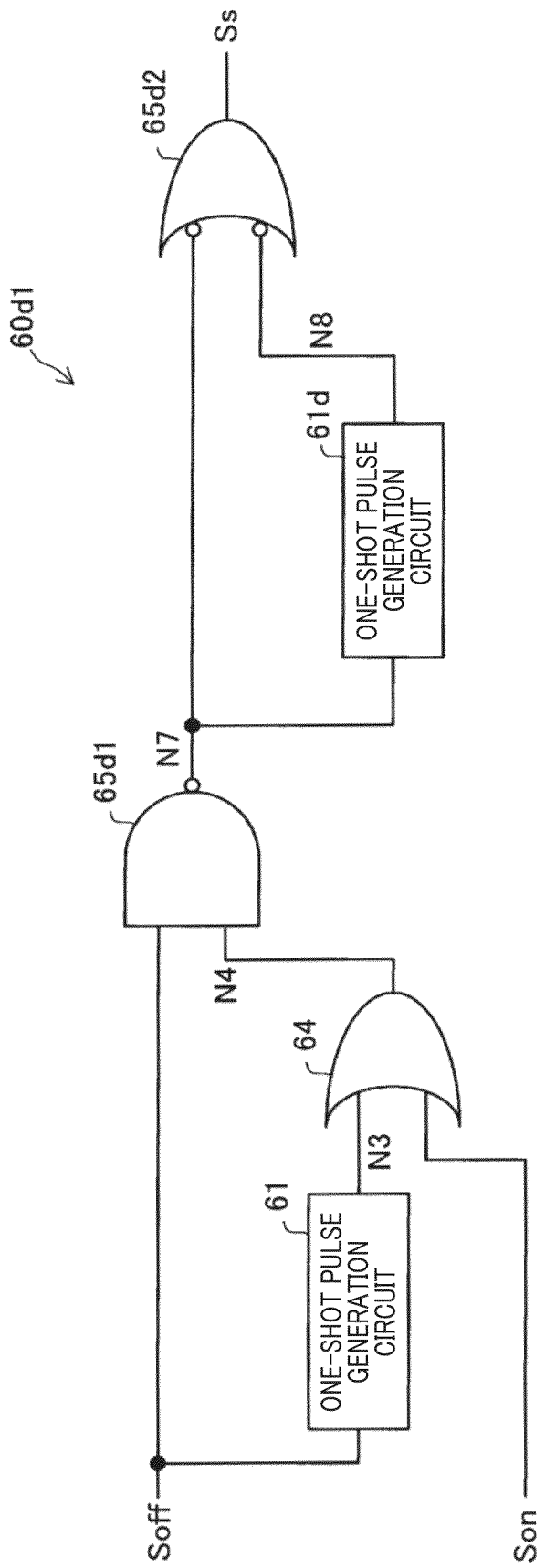
FIG. 23 is an explanatory diagram illustrating the configuration of a switching circuit according to a modification of the sixth embodiment.

FIG. 23 is an explanatory diagram illustrating the configuration of a switching circuit 60d1 that is a modification of the switching circuit 60d of the sixth embodiment. Compared to the switching circuit 60d shown in FIG. 21, in the switching circuit 60d1 shown in FIG. 23, the AND circuit 65 is replaced with a NAND circuit 65d1; the AND circuit 65d is replaced with a NAND circuit 65d2; and the two inverters I6 and I7 are removed.

Figure 24:
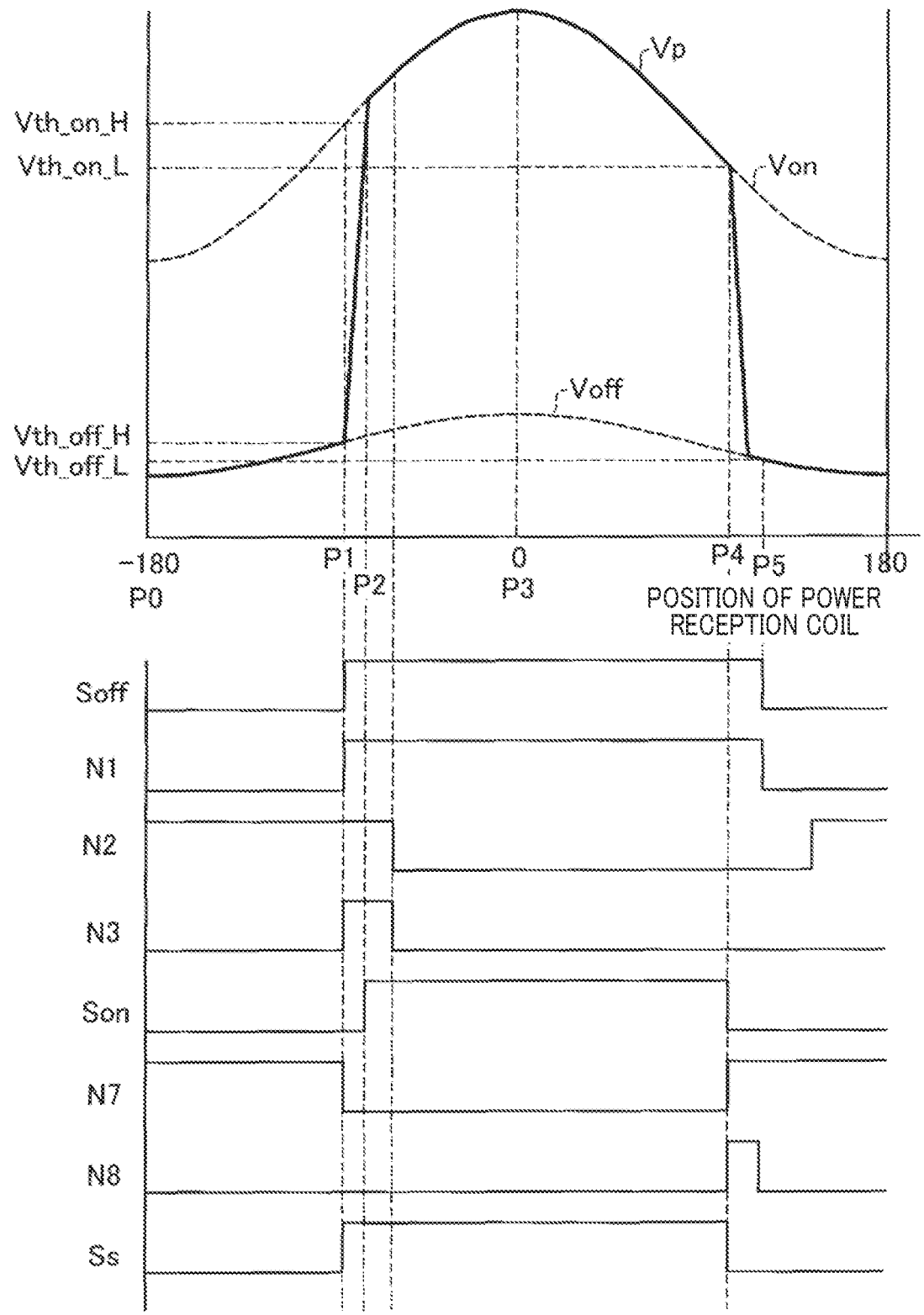
FIG. 24 is an explanatory diagram showing the trajectory of the voltage of the power transmission coil, which is the physical quantity, with movement of the power reception coil and the outputs of signals in the switching circuit according to the modification of the sixth embodiment.

FIG. 24 is an explanatory diagram showing the trajectory of the voltage Vp, which is the physical quantity, with movement of the power reception coil 241 and the outputs of signals in the switching circuit 60d1. In addition, in the switching circuit 60d1, a node N7 is the output node of the NAND circuit 65d1; and a node N8 is the output node of the one-shot pulse generation circuit 61d. The signal at the node N7 is equivalent to a signal obtained by swapping the [H] and [L] of the signal at the node N5 shown in FIGS. 21 and 22; and the signal at the node N8 is equivalent to a signal obtained by swapping the [H] and [L] of the signal at the node N6 shown in FIGS. 21 and 22. Therefore, the operation of the switching circuit 60d1 is exactly the same as the operation of the switching circuit 60d. In general, in semiconductor circuits, a NAND circuit is simpler than an AND circuit; and an AND circuit is configured by adding an inverter to the output of a NAND circuit. Therefore, with the switching circuit 60d1, it is possible to reduce the number of inverters by four and suppress occurrence of a signal delay or timing skew due to multi-stage inverters, as compared with the case of employing the switching circuit 60d.

Seventh Embodiment

In the seventh embodiment, after the state of the power transmission circuit 40 is switched from the resonant state to the non-resonant state, the non-resonant state is maintained for the off-keeping time (Toff_prsv), as in the sixth embodiment. However, the seventh embodiment differs from the sixth embodiment in that the off-keeping time is varied depending on the time during which the power transmission circuit 40 was in the resonant state.

Figure 25:
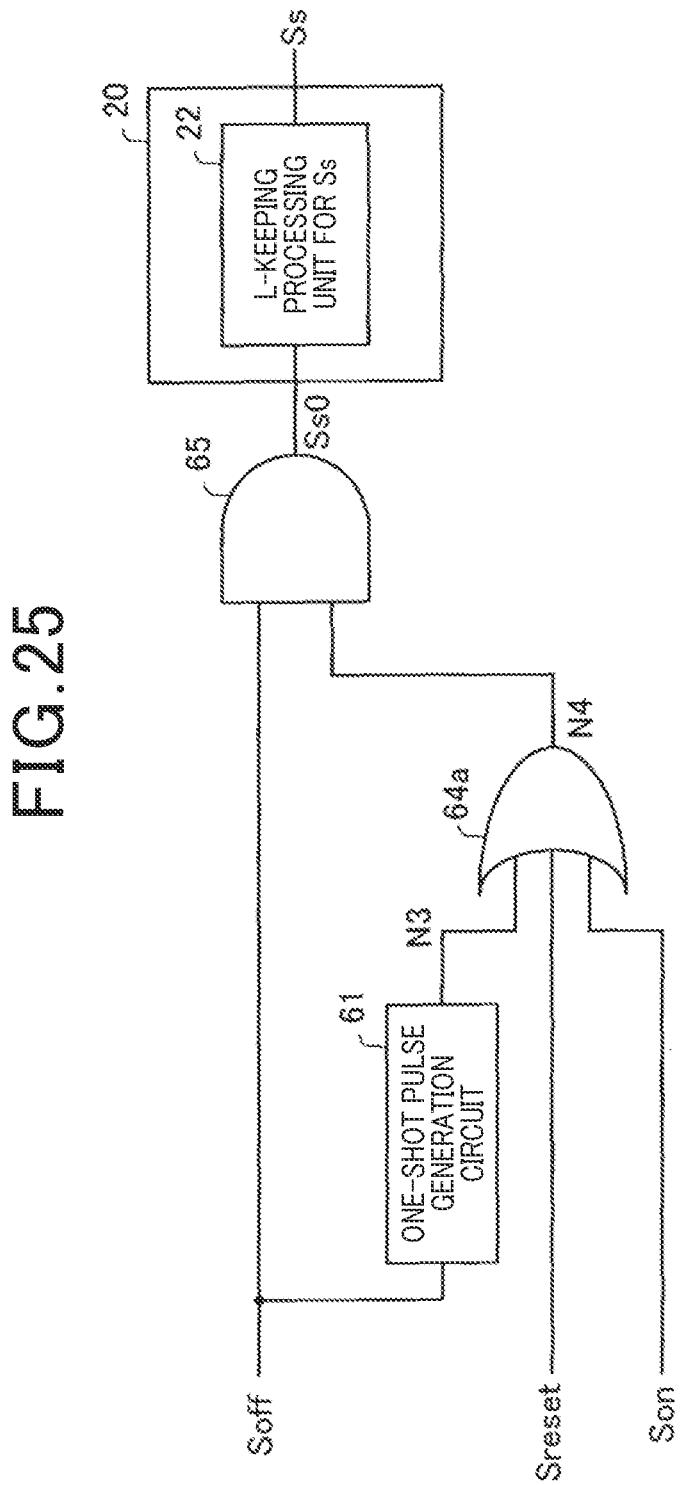
FIG. 25 is an explanatory diagram illustrating the configuration of a switching circuit according to a seventh embodiment.

FIG. 25 is an explanatory diagram illustrating the configuration of a switching circuit 60e of the seventh embodiment. Compared to the switching circuit 60 of the first embodiment described with reference to FIG. 8, the switching circuit 60e of the seventh embodiment further includes, after the AND circuit 65, an L-keeping processing unit 22 for the switching signal Ss. A signal Ss0, which is the output of the AND circuit 65, is inputted to the L-keeping processing unit 22; and the L-keeping processing unit 22 outputs the switching signal Ss. In the first embodiment, the output of the AND circuit 65 is the switching signal Ss. In contrast, in the seventh embodiment, the output of the AND circuit 65 is not the switching signal Ss, and therefore referred to as the "signal Ss0". When the signal Ss0 has transitioned from [H] to [L], the L-keeping processing unit 22 keeps the switching signal Ss at [L] according to the time during which the signal Ss0 was at [H]. In addition, except for the period during which the switching signal Ss is kept at [L] after the transition of the signal Ss0 from [H] to [L], the L-keeping processing unit 22 outputs the switching signal Ss at [H] if the inputted signal Ss0 is at [H], and outputs the switching signal Ss at [L] if the inputted signal Ss0 is at [L]. In other words, except for a certain period of time after the transition of the signal Ss0 from [H] to [L], the [H] and [L] of the switching signal Ss coincide with the [H] and [L] of the signal Ss0.

Figure 26:
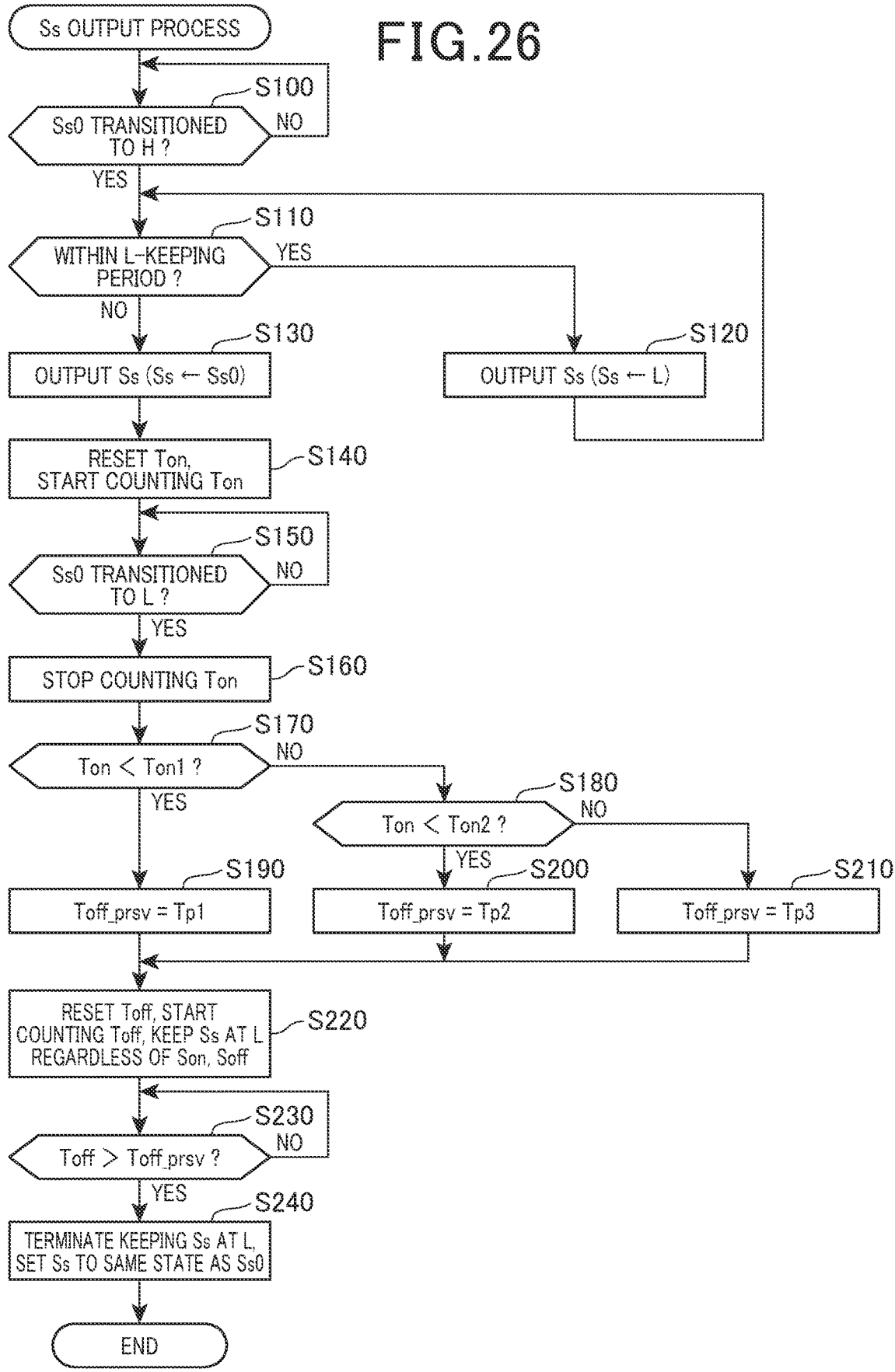
FIG. 26 is a flowchart illustrating an output process of a switching signal performed by an L-keeping processing unit.

FIG. 26 is a flowchart illustrating an output process of the switching signal Ss performed by the L-keeping processing unit 22. When the signal Ss0, which is the output of the AND circuit 65 shown in FIG. 25, has transitioned from [L] to [H] step S100: Yes), the L-keeping processing unit 22 advances the process to step S110. In step S110, the L-keeping processing unit 22 determines whether it is within the period during which the switching signal Ss is to be kept at [L]. In addition, the period during which the switching signal Ss is to be kept at [L] is set in step S220 which will be described later. If it is within the period during which the switching signal Ss is to be kept at [L] (step S110: Yes), the L-keeping processing unit 22 advances the process to step S120. In contrast, if it is not within the period during which the switching signal Ss is to be kept at [L] (step S110: No), the L-keeping processing unit 22 advances the process to step S130. For example, when it is determined to be within the period during which the switching signal Ss is to be kept at [L], the L-keeping processing unit 22 may set a flag. In contrast, when it is determined to be not within the period during which the switching signal Ss is to be kept at [L], the L-keeping processing unit 22 may clear the flag. In this case, it is possible to determine, based on whether a flag has been set, whether it is within the period during which the switching signal Ss is to be kept at [L].

In step S120, the L-keeping processing unit 22 sets the output switching signal Ss to [L], and then returns the process to step S110. In contrast, in step S130, the L-keeping processing unit 22 outputs the same signal as the inputted signal Ss0 as the switching signal Ss. In addition, since the signal Ss0 has been determined in step S100 to be at [H], the L-keeping processing unit 22 outputs the switching signal Ss at [H] in step S130.

In step S140, the L-keeping processing unit 22 resets a power supply time Ton and starts counting the power supply time Ton. Then, if the signal Ss0 is determined in step S150 to have transitioned from [H] to [L] (step S150: Yes), the L-keeping processing unit 22 advances the process to step S160, in which it stops counting the power supply time Ton. In addition, the power supply time Ton corresponds to the time for which the signal Ss0 has been at [H], i.e., the time for which the power transmission circuit 40 has been in the power transmission state after the state of the switching signal Ss becomes [H].

In step S170, the L-keeping processing unit 22 determines whether the power supply time Ton is shorter than a first determination value Ton1. If the power supply time Ton is determined to be shorter than the first determination value Ton1 (step S170: Yes), the L-keeping processing unit 22 advances the process to step S190. In contrast, if the power supply time Ton is determined to be longer than or equal to the first determination value Ton1 (step S170: No), the L-keeping processing unit 22 advances the process to step S180.

In step S180, the L-keeping processing unit 22 determines whether the power supply time Ton is shorter than a second determination value Ton2. The second determination value Ton2 is greater than the first determination value Ton1. If the power supply time Ton is determined to be shorter than the second determination value Ton2 (step S180: Yes), the L-keeping processing unit 22 advances the process to step S200. In contrast, if the power supply time Ton is determined to be longer than or equal to the second determination value Ton2 (step S180: No), the L-keeping processing unit 22 advances the process to step S210.

In step S190, the L-keeping processing unit 22 sets the off-keeping time Toff_prsv to Tp1. The off-keeping time Toff_prsv is the time for which the switching signal Ss is to be kept at [L]. In step S200, the L-keeping processing unit 22 sets the off-keeping time Toff_prsv to Tp2. In step S210, the L-keeping processing unit 22 sets the off-keeping time Toff_prsv to Tp3. It should be noted that the lengths of Tp1, Tp2 and Tp3 satisfy the following relationship: Tp1<Tp2<Tp3. Therefore, the longer the time for which the switching signal Ss has been at [H], i.e., the longer the power supply time Ton, the longer the off-keeping time Toff_prsv is set to be.

In step S220, the L-keeping processing unit 22 resets an off-keeping elapsed time Toff, and starts counting the off-keeping elapsed time Toff. Moreover, the L-keeping processing unit 22 keeps the output switching signal Ss at [L] regardless of the states of the signals Son and Soff.

In step S230, the L-keeping processing unit 22 determines whether the off-keeping elapsed time Toff has exceeded the off-keeping time Toff_prsv. If the off-keeping elapsed time Toff is determined to have exceeded the off-keeping time Toff_prsv (step S230: Yes), the L-keeping processing unit 22 advances the process to step S240.

In step S240, the L-keeping processing unit 22 terminates keeping the switching signal Ss at [L] and sets the switching signal Ss to the same state as the signal Ss0. That is, the L-keeping processing unit 22 sets the switching signal Ss to [H] when the signal Ss0 is at [H], and sets the switching signal Ss to [L] when the signal Ss0 is at [L].

Figure 27:
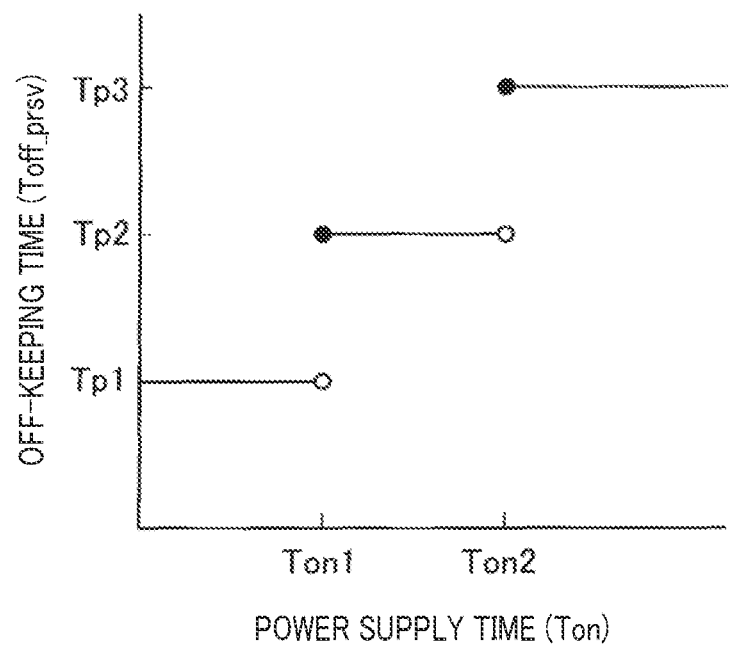
FIG. 27 is a graph illustrating the relationship between power supply time and off-keeping time.

FIG. 27 is a graph illustrating the relationship between the power supply time Ton and the off-keeping time Toff_prsv. As can be seen from the graph, when the power supply time Ton is shorter than Ton1, the off-keeping time Toff_prsv is Tp1; when the power supply time Ton is longer than or equal to Ton1 and shorter than Ton2, the off-keeping time Toff_prsv is Tp2; and when the power supply time Ton is longer than or equal to Ton2, the Off-keeping time Toff_prsv is Tp3.

With increase in the power supply time Ton, the temperature of the power transmission circuit 40 including the power transmission coil 41 increases. According to the seventh embodiment, after the switching signal Ss (or the signal Ss0) is switched from [H] to [L], the switching signal Ss is kept at [L] for a time corresponding to the length of the power supply time Ton, even if the conditions for the switching signal Ss to transition to [H] become satisfied depending on the states of the signals Son and Soff; the power supply time Ton is the time for which the switching signal Ss (or the signal Ss0) was kept at [H] until being switched to [L]. As a result, the power transmission circuit 40 including the power transmission coil 41 can be cooled down and thus the operating rate of the power transmission circuit 40 can be improved.

In the present embodiment, the L-keeping processing unit 22 switches the off-keeping time Toff_prsv in three stages depending on the power supply time Ton. Alternatively, the L-keeping processing unit 22 may switch the off-keeping time Toff_prsv in four or more stages depending on the power supply time Ton, or may switch the off-keeping time Toff_prsv steplessly according to the power supply time Ton. For example, the off-keeping time Toff_prsv may be set to be c times the power supply time Ton.

In the present embodiment, the switching signal Ss is kept at [L] by the L-keeping processing unit 22. However, the switching signal Ss may be kept at [L] by, instead of the L-keeping processing unit 22, software processing using a microcomputer.

Eighth Embodiment

Figure 28:
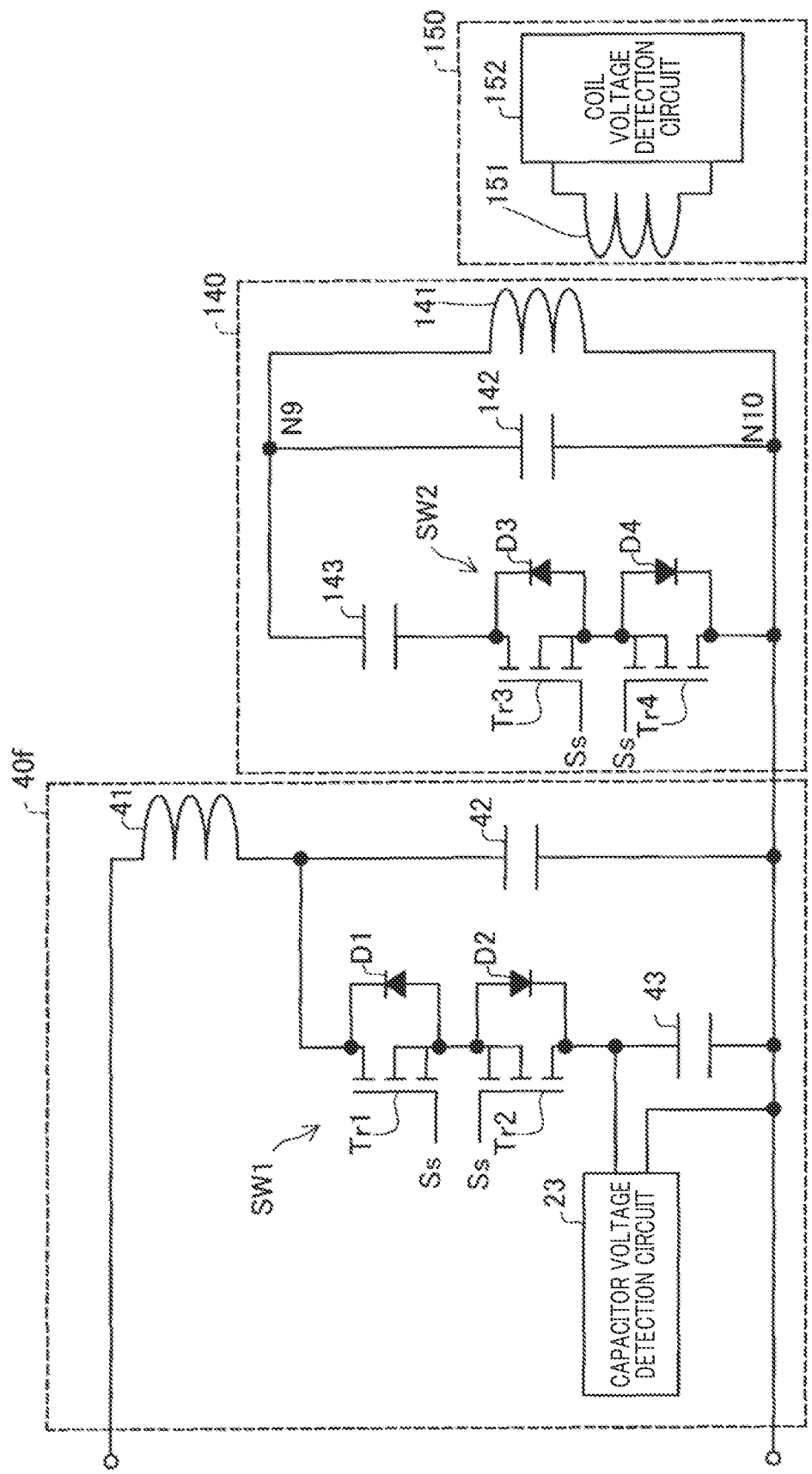
FIG. 28 is an explanatory diagram illustrating the circuitry of a power transmission system according to an eighth embodiment.

FIG. 28 is an explanatory diagram illustrating the circuitry of a power transmission system according to the eighth embodiment. The circuitry of the power transmission system according to the eighth embodiment includes a power transmission circuit 40f, a relay circuit 140 and a detection circuit 150. The power transmission circuit 40f is similar to the power transmission circuit 40 of the first embodiment. The eighth embodiment differs from the first embodiment in that the measurement unit 21 is employed to measure the voltage of the power transmission coil 41 in the first embodiment, whereas a capacitor voltage detection circuit 23 is employed to measure the voltage of the capacitor 43 in the eighth embodiment. Moreover, in the eighth embodiment, the switch SW1 of the power transmission circuit 40f includes two MOS transistors Tr1 and Tr2 that are connected in series with each other, and diodes D1 and D2 that are connected respectively in parallel to the MOS transistors Tr1 and Tr2. The orientations of the two diodes D1 and D2 are opposite to each other; therefore, the switch SW1 is turned on when both the MOS transistors Tr1 and Tr2 are turned on, and is turned off when both the MOS transistors Tr1 and Tr2 are turned off. The power transmission circuit 40f is in a resonant state when the switch SW1 is in the on-state, and is in a non-resonant state when the switch SW1 is in the off-state. In the present embodiment, the capacitor 43 has a high-pass filter configuration; therefore, the voltage between both ends of the capacitor 43, which is measured by the capacitor voltage detection circuit 23, corresponds to the electric current of a fundamental frequency component of the power transmission circuit 40. In addition, in the present embodiment, the MOS transistors Tr1 and Tr2 are employed as the switching elements of the switch SW1; however, field effect transistors such as MOSFETs or SiCFETs, or bipolar transistors such as IGBTs may alternatively be employed as the switching elements of the switch SW1. Further, in the present embodiment, the switch SW1 has a bidirectional configuration employing the two MOS transistors Tr1 and Tr2; however, the switch SW1 may alternatively have a unidirectional configuration employing only one of the MOS transistors Tr1 and Tr2. The bidirectional configuration employing the two MOS transistors Tr1 and Tr2 for the switch SW1 is advantageous in terms of withstand voltage. In contrast, the unidirectional configuration employing only one of the MOS transistors Tr1 and Tr2 for the switch SW1 is advantageous in terms of enabling reduction in the number of switching elements.

The relay circuit 140 includes a relay coil 141, capacitors 142 and 143, and a switch SW2. The capacitor 143 and the switch SW2 are connected in series with each other. One terminal of the relay coil 141, one terminal of the capacitor 142 and a terminal of the capacitor 143 on the opposite side to the switch SW2 are connected together at a node N9; and the other terminal of the relay coil 141, the other terminal of the capacitor 142 and a terminal of the switch SW2 on the opposite side to the capacitor 143 are connected together at a node 10. Moreover, the node N10 of the relay circuit 140 is connected with the power transmission circuit 40f. Similar to the switch SW1, the switch SW2 includes two MOS transistors Tr3 and Tr4 that are connected in series with each other, and diodes D3 and D4 that are connected respectively in parallel to the MOS transistors Tr3 and Tr4. The orientations of the two diodes D3 and D4 are opposite to each other; therefore, the switch SW2 is turned on when both the MOS transistors Tr3 and Tr4 are turned on, and is turned off when both the MOS transistors Tr3 and Tr4 are turned off. The relay circuit 140 is in a resonant state when the switch SW2 is in the on-state, and is in a non-resonant state when the switch SW2 is in the off-state. Similar to the switch SW1 for the switch SW2, field effect transistors such as MOSFETs or SiCFETs, or bipolar transistors such as IGBTs may alternatively be employed as the switching elements. Further, the switch SW2 may alternatively be configured to employ only one of the MOS transistors Tr3 and Tr4. The bidirectional configuration employing the two MOS transistors Tr3 and Tr4 for the switch SW2 is advantageous in terms of withstand voltage. In contrast, the unidirectional configuration employing only one of the MOS transistors Tr3 and Tr4 for the switch SW2 is advantageous in terms of enabling reduction in the number of switching elements.

The detection circuit 150 includes a detection coil 151 and a coil voltage detection circuit 152. The detection coil 151 is electrically insulated from both the power transmission coil 41 and the relay coil 141. Moreover, the detection coil 151 is magnetically coupled with both the power transmission coil 41 and the relay coil 141. The coil voltage detection circuit 152 detects a voltage generated in the detection coil 151 by a change in magnetic flux passing through the detection coil 151.

Figure 29:
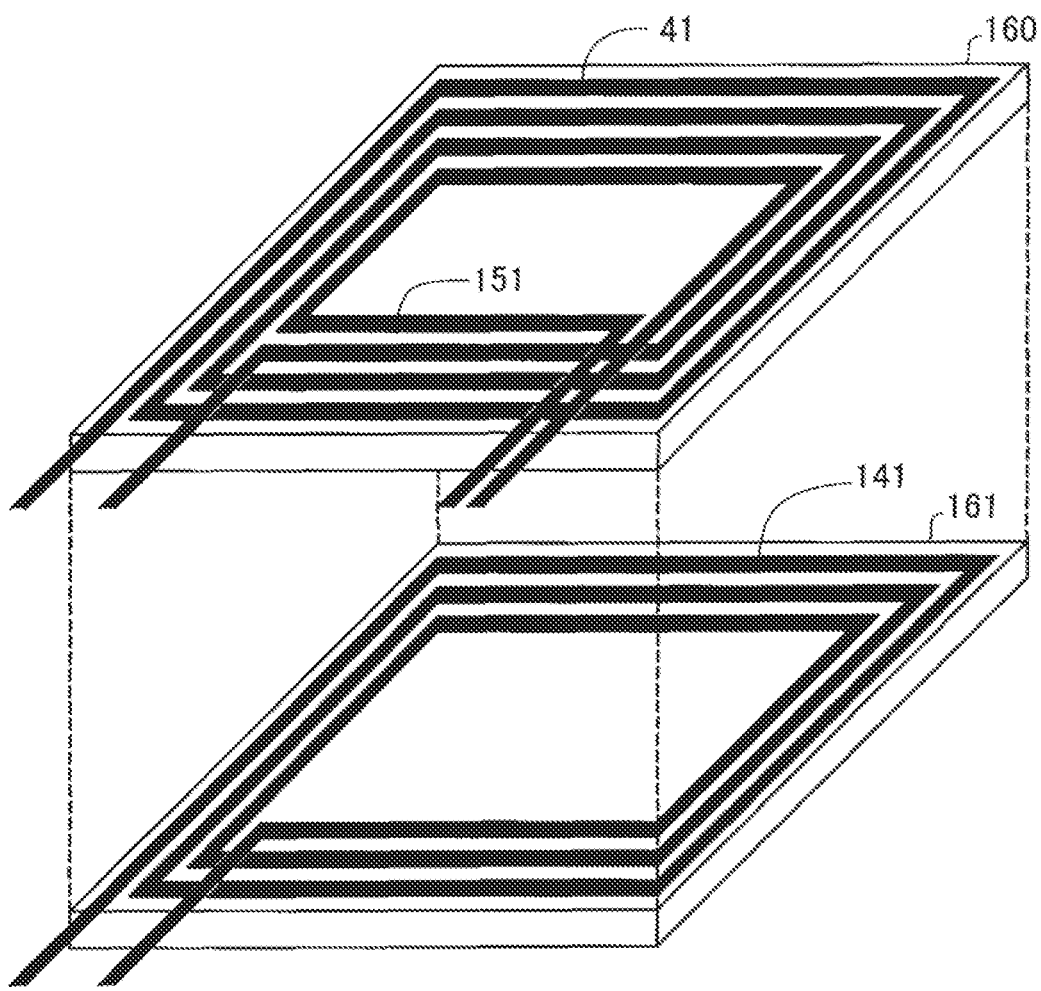
FIG. 29 is an explanatory diagram illustrating the arrangement of a power transmission coil, a relay coil and a detection coil according to the eighth embodiment.

FIG. 29 is an explanatory diagram illustrating the arrangement of the power transmission coil 41, the relay coil 141 and the detection coil 151. The power transmission coil 41 is arranged on a surface of a first substrate 160; and the detection coil 151 is arranged inside the power transmission coil 41. It should be noted that the detection coil 151 may alternatively be arranged outside the power transmission coil 41. On the other hand, the relay coil 141 is arranged on a second substrate 161 that overlaps the first substrate 160. The inner diameter and outer diameter of the relay coil 141 are substantially equal to those of the power transmission coil 41. In the present embodiment, both the power transmission coil 41 and the detection coil 151 are arranged on the first substrate 160; and the relay coil 141 is arranged on the second substrate 161. As an alternative, both the power transmission coil 41 and the detection coil 151 may be arranged on one surface of the first substrate 160; and the relay coil 141 may be arranged on the other surface of the first substrate 160. As another alternative, the power transmission coil 41 may be arranged alone on one surface of the first substrate 160; and both the relay coil 141 and the detection coil 151 may be arranged on the other surface of the first substrate 160. As yet another alternative, the power transmission coil 41 may be arranged alone on one surface of the first substrate 160; the relay coil 141 may be arranged alone on the other surface of the first substrate 160; and the detection coil 151 may be arranged on the second substrate 161. In the example shown in FIG. 29, the relay coil 141 is arranged above or below both the power transmission coil 41 and the detection coil 151. As an alternative, all of the three coils may be arranged on the same plane. That is, the power transmission coil 41, the relay coil 141 and the detection coil 151 are only required to be arranged in a positional relationship in which they are coupled to each other.

When supplying electric power to the vehicle 202, the power-supply-side control unit 20 turns on both the switches SW1 and SW2, thereby setting both the power transmission circuit 40f and the relay circuit 140 to the resonant state. In this state, as the vehicle 202 moves away from the power transmission coil 41, the electric current flowing through the power transmission coil 41 decreases and thus the voltage of the capacitor 43 changes. By measuring the voltage of the capacitor 43, the capacitor voltage detection circuit 23 can detect the decrease in the electric current flowing through the power transmission coil 41, i.e., can detect the degree of coupling between the power transmission coil 41 and the power reception coil 241. Moreover, as the vehicle 202 moves away from the power transmission coil 41, the electric current flowing through the detection coil 151 also decreases. The coil voltage detection circuit 152 detects the electric current flowing through the detection coil 151 by measuring the voltage of the detection coil 151. By measuring both the voltage of the capacitor 43 and the voltage of the detection coil 151, the power-supply-side control unit 20 can determine whether to set the switching signal Ss to [H] and thereby supply electric power to the vehicle 202, or to set the switching signal Ss to [L] and thereby stop the supply of electric power to the vehicle 202.

Figure 30:
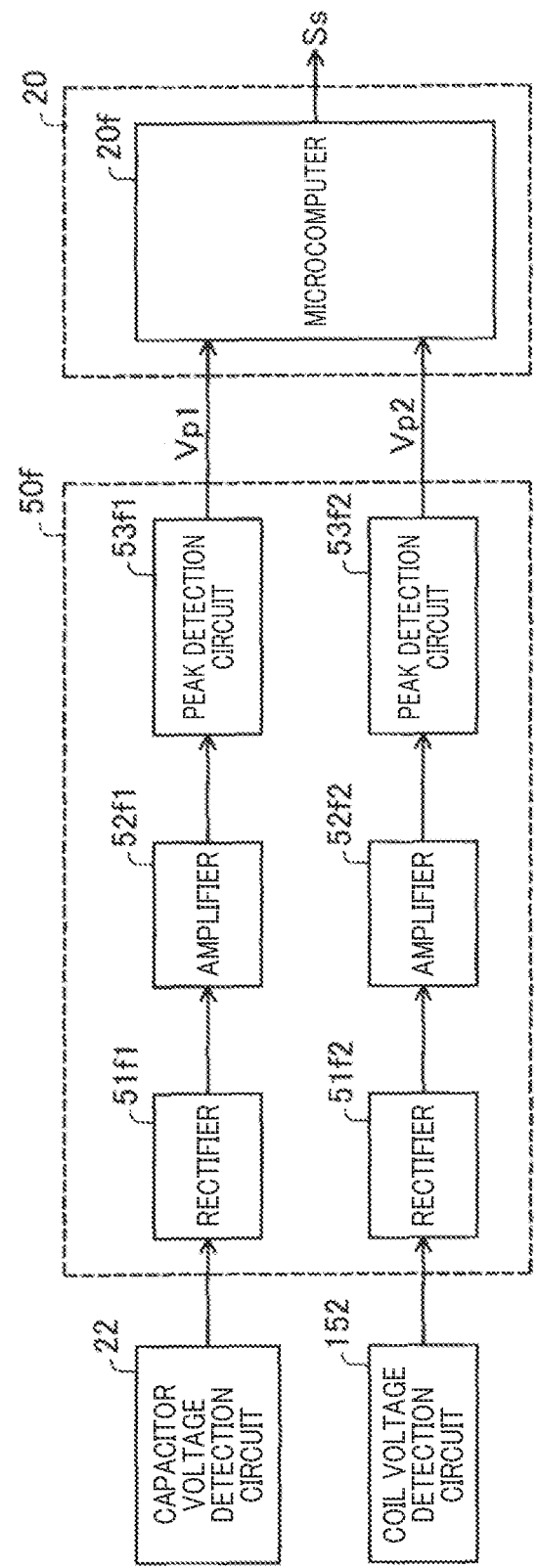
FIG. 30 is an explanatory diagram illustrating the configuration of a peak detection unit according to the eighth embodiment.

FIG. 30 is an explanatory diagram illustrating the configuration of a peak detection unit 50f. The peak detection unit 50f includes rectifiers 51/1 and 51/2, operational amplifiers 52/1 and 52/2, and peak detection circuits 53/1 and 53/2. The rectifier 51/1 converts the AC voltage inputted from the capacitor voltage detection circuit 23 into a DC voltage. The operational amplifier 52/1 has a function of adjusting the gain of the DC voltage obtained by the rectifier 51/1. The peak detection circuit 53/1 detects a peak voltage Vp1 of the output of the operational amplifier 52/1. Similarly, the rectifier 51/2 converts the AC voltage inputted from the coil voltage detection circuit 152 into a DC voltage. The operational amplifier 52/2 has a function of adjusting the gain of the DC voltage obtained by the rectifier 51/2. The peak detection circuit 53/2 detects a peak voltage Vp2 of the output of the operational amplifier 52/2.

In the first embodiment, the determination circuit 50 includes the comparators 55 and 57, and compares the peak voltage Vp with the threshold values Vth_off_H, and Vth_off_L, Vth_on_H and Vth_on_L and thereby sets the states of the signals Son and Soff to [H] or [L]. In contrast, in the eighth embodiment, the peak voltages Vp1 and Vp2 are inputted to a microcomputer 20f provided in the power-supply-side control unit 20; and the microcomputer 20f performs operations based on the transitions of the peak voltages Vp1 and Vp2, and thereby outputs the switching signal Ss. As above, it is possible to determine the measurement results and output the switching signal Ss by the microcomputer 20f without employing the comparators 55 and 57. As an alternative, the microcomputer 20f may compare the voltages Vp1 and Vp2 with internal determination values using comparators. Moreover, the microcomputer 20f may convert, by A/D conversion, the voltages Vp1 and Vp2 into digital values and compare the digital values with the determination values.

As described above, according to the present embodiment, the microcomputer 20f can output the switching signal Ss through software processing based on the transitions of the peak voltages Vp1 and Vp2. Moreover, through the software processing, the microcomputer 20f can set an optimal cool-down period according to the operating time of the power transmission circuit 40 (i.e., the time for which the switching signal Ss is kept at [H]), thereby improving the operating rate of the power transmission circuit 40.

Modification of Eighth Embodiment

Figure 31:
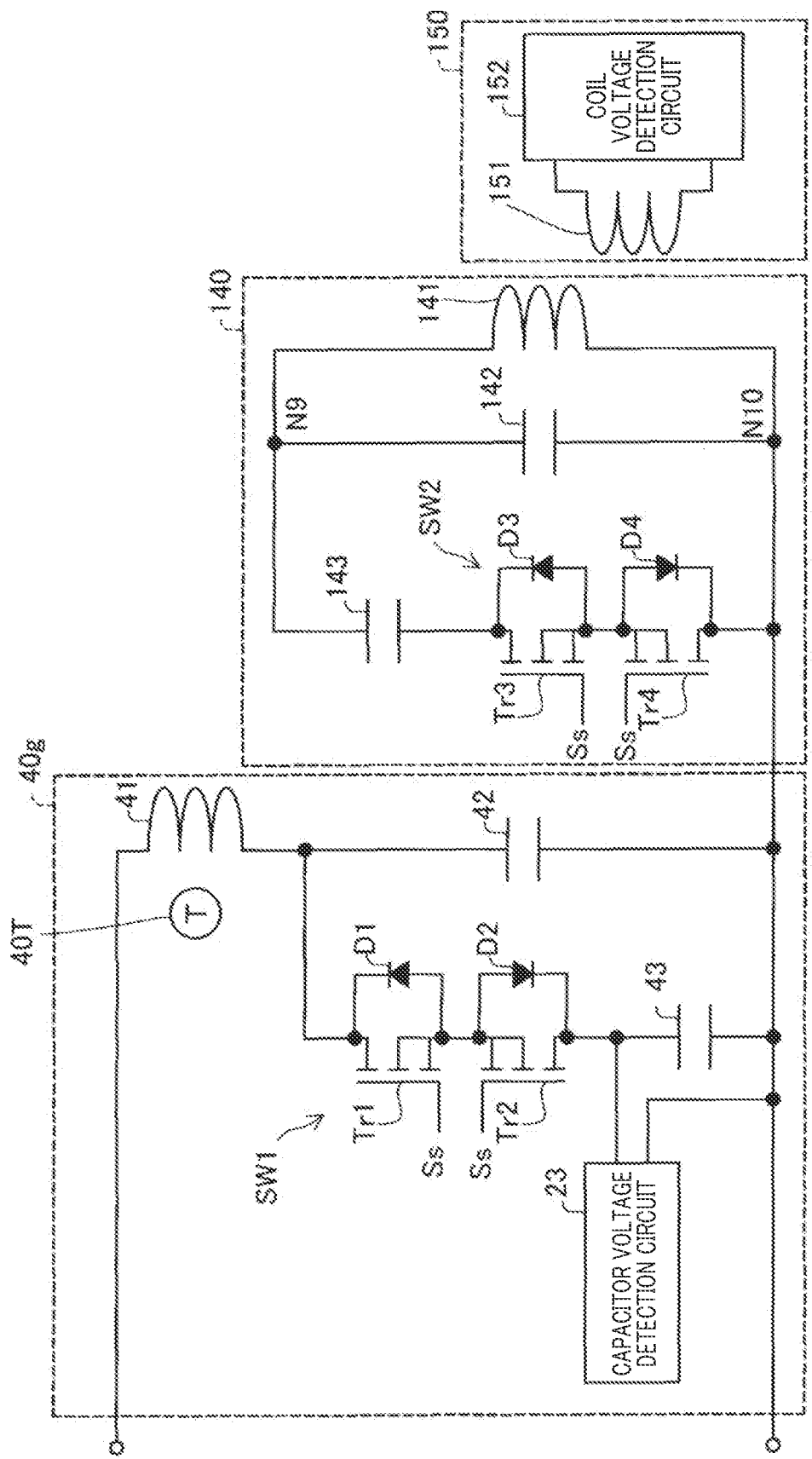
FIG. 31 is an explanatory diagram illustrating the circuitry of a power transmission system according to a modification of the eighth embodiment.

FIG. 31 is an explanatory diagram illustrating the circuitry of a power transmission system according to a modification of the eighth embodiment. This modification differs from the eighth embodiment shown in FIG. 28 in that a power transmission circuit temperature measurement unit 40T is added to a power transmission circuit 40g. The power transmission circuit temperature measurement unit 40T measures the temperature of the power transmission coil 41 of the power transmission circuit 40g. In the modification of the eighth embodiment, when the power transmission circuit 40g has transitioned from the resonant state to the non-resonant state, the power-supply-side control unit 20 keeps the switching signal Ss at L for a period of time corresponding to the temperature of the power transmission circuit 40g.

Figure 32:
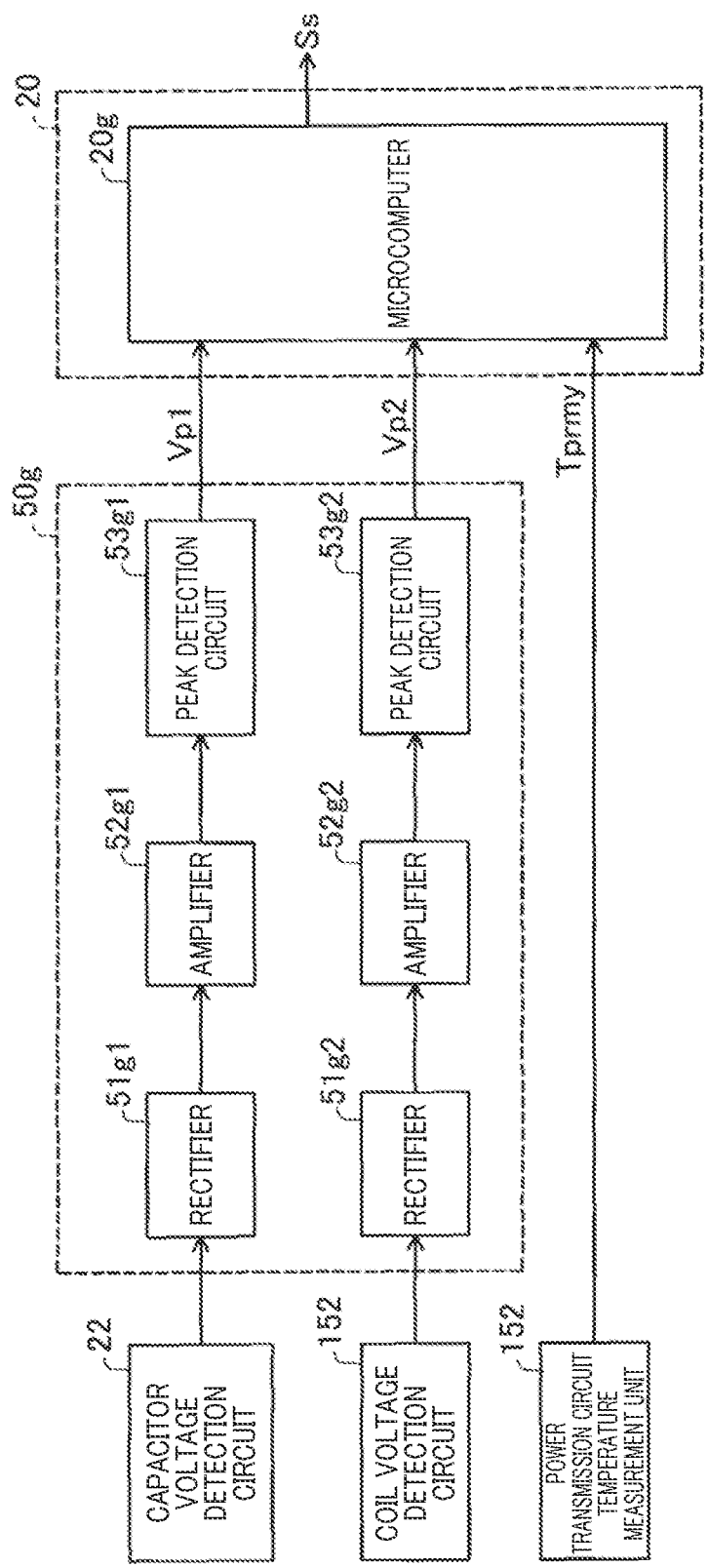
FIG. 32 is an explanatory diagram illustrating the configuration of a peak detection unit according to the modification of the eighth embodiment.

FIG. 32 is an explanatory diagram illustrating the configuration of a peak detection unit 50g in the modification of the eighth embodiment. The configuration of the peak detection unit 50g is similar to the configuration of the peak detection unit 50f of the eighth embodiment. The modification differs from the eighth embodiment in that the temperature Tprmy of the power transmission circuit 40g measured by the power transmission circuit temperature measurement unit 40T is also inputted to the microcomputer 20g.

Figure 33:
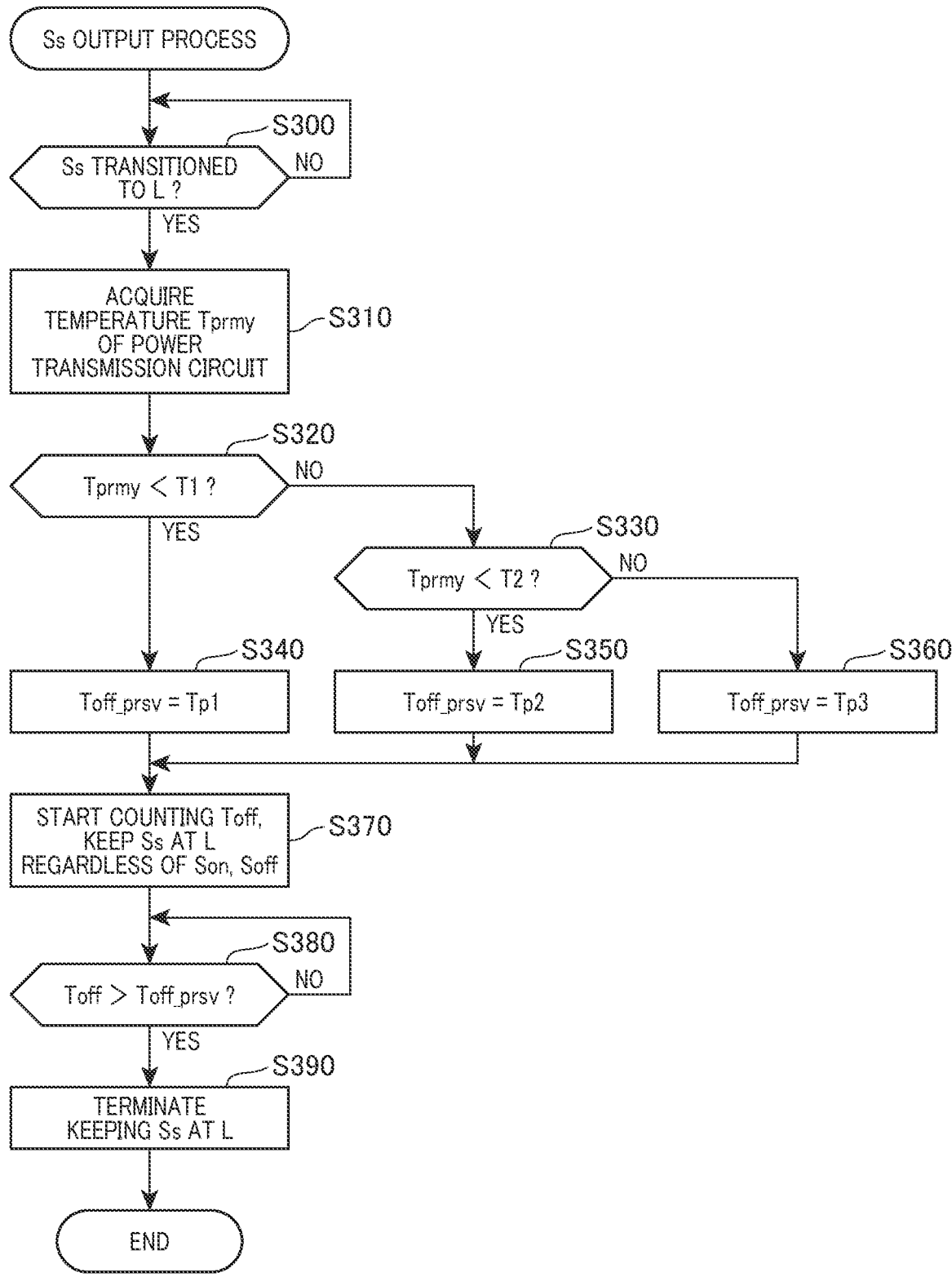
FIG. 33 is a flowchart illustrating an output process of a switching signal performed by a microcomputer.

FIG. 33 is a flowchart illustrating an output process of the switching signal Ss performed by the microcomputer 20g. When the signal Ss is determined in step S300 to have transitioned from [H] to [L] (step S300: Yes), the microcomputer 20g advances the process to step S310. In step S310, the microcomputer 20g acquires the temperature Tprmy of the power transmission circuit 40g using the power transmission circuit temperature measurement unit 40T.

In step S320, the microcomputer 20g determines whether the temperature Tprmy is lower than a first determination value T1. If the temperature Tprmy is determined to be lower than the first determination value T1 (step S320: Yes), the microcomputer 20g advances the process to step S340. In contrast, if the temperature Tprmy is determined to be higher than or equal to the first determination value T1 (step S320: No), the microcomputer 20g advances the process to step S330.

In step S330, the microcomputer 20g determines whether the temperature Tprmy is lower than a second determination value T2. The second determination value T2 is a temperature higher than the first determination value T1. If the temperature Tprmy is determined to be lower than the second determination value T2 (step S330: Yes), the microcomputer 20g advances the process to step S350. In contrast, if the temperature Tprmy is determined to be higher than or equal to the second determination value T2 (step S330: No), the microcomputer 20g advances the process to step S360.

In step S340, the microcomputer 20g sets the off-keeping time Toff_prsv to Tp1. The off-keeping time Toff_prsv is the time for which the switching signal Ss is to be kept at [L]. In step S350, the microcomputer 20g sets the off-keeping time Toff_prsv to Tp2. In step S360, the microcomputer 20g sets the off-keeping time Toff_prsv to Tp3. It should be noted that the lengths of Tp1, Tp2 and Tp3 satisfy the following relationship: Tp1<Tp2<Tp3. Therefore, the higher the temperature Tprmy of the power transmission circuit 40g, the longer the off-keeping time Toff_prsv is set to be.

In step S370, the microcomputer 20g resets an off-keeping elapsed time Toff, and starts counting the off-keeping elapsed time Toff. Moreover, the microcomputer 20g keeps the output switching signal Ss at [L] regardless of the states of the signals Son and Soff.

In step S380, the microcomputer 20g determines whether the off-keeping elapsed time Toff has exceeded the off-keeping time Toff_prsv. If the off-keeping elapsed time Toff is determined to have exceeded the off-keeping time Toff_prsv (step S380: Yes), the microcomputer 20g advances the process to step S390. In step S390, the microcomputer 20g terminates keeping the switching signal Ss at [L].

Figure 34:
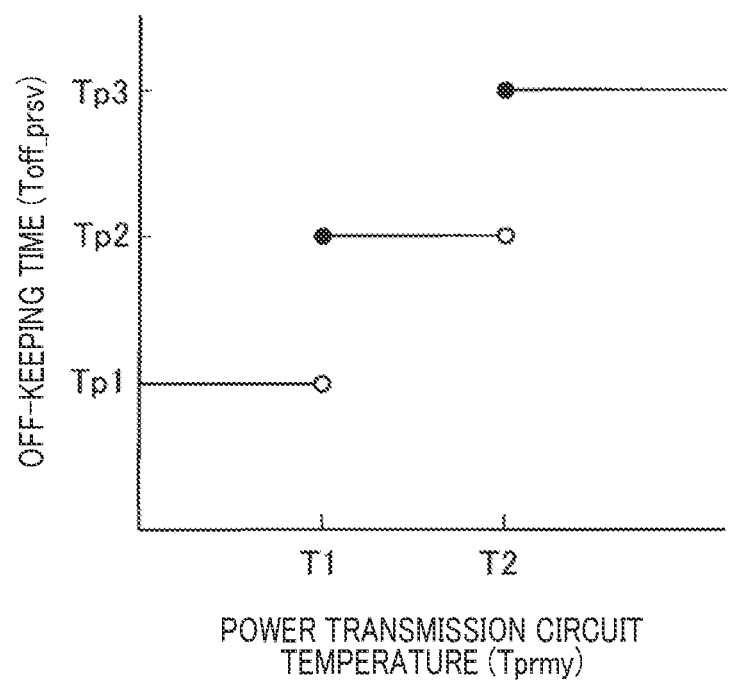
FIG. 34 is a graph illustrating the relationship between the temperature of the power transmission circuit and the off-keeping time.

FIG. 34 is a graph illustrating the relationship between the temperature Tprmy of the power transmission circuit 40g and the off-keeping time Toff_prsv. As can be seen from the graph, when the temperature Tprmy of the power transmission circuit 40g is lower than T1, the off-keeping time Toff_prsv is Tp1; when the temperature Tprmy of the power transmission circuit 40g is higher than or equal to T1 and lower than T2, the off-keeping time Toff_prsv is Tp2; and when the temperature Tprmy of the power transmission circuit 40g is higher than or equal to T2, the off-keeping time Toff_prsv is Tp3.

According to the present modification, after the switching signal Ss is switched from [H] to [L], for a time corresponding to the temperature Tprmy of the power transmission circuit 40g when the switching signal Ss was switched from [H] to [L], the microcomputer 20g keeps the switching signal Ss at [L] and thereby keeps the power transmission circuit 40g from being set to the resonant state (thus to the power supply state) even if the conditions for the switching signal Ss to transition to [H] become satisfied depending on the states of the signals Son and Soff. As a result, the power transmission circuit 40g including the power transmission coil 41 can be cooled down and thus the operating rate of the power transmission circuit 40g can be improved.

In the present modification, the microcomputer 20g switches the off-keeping time Toff_prsv in three stages depending on the temperature Tprmy of the power transmission circuit 40g. Alternatively, the microcomputer 20g may switch the off-keeping time Toff_prsv in four or more stages depending on the temperature Tprmy of the power transmission circuit 40g, or may switch the off-keeping time Toff_prsv steplessly according to the temperature Tprmy of the power transmission circuit 40g. Moreover, in the present modification, the switching signal Ss is kept at L by software processing using the microcomputer 20g. Alternatively, the switching signal Ss may be kept at L by an L-keeping processing unit as in the seventh embodiment.

Ninth Embodiment

Figure 35:
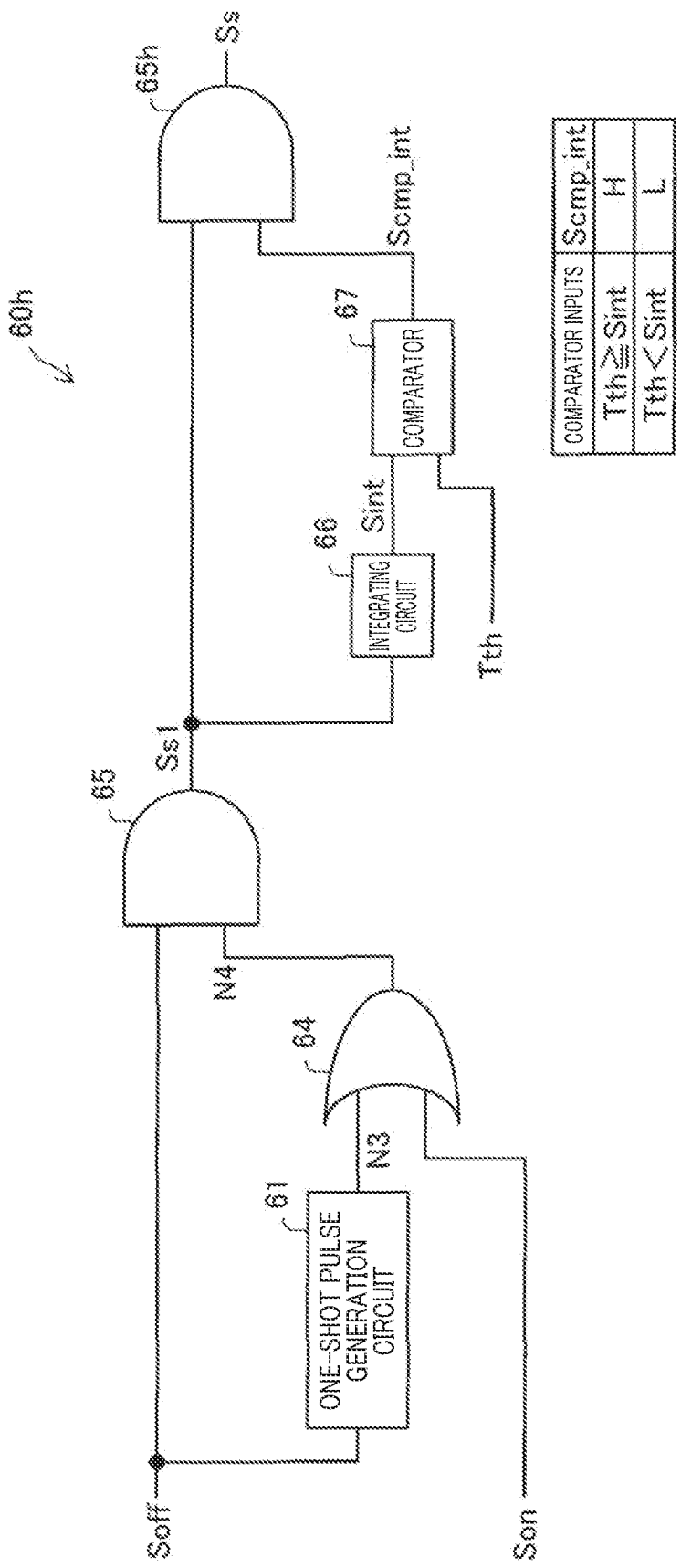
FIG. 35 is an explanatory diagram illustrating the configuration of a switching circuit according to a ninth embodiment.

FIG. 35 is an explanatory diagram illustrating configuration of a switching circuit 60h of the ninth embodiment. The switching circuit 60h differs from the switching circuit 60d of the sixth embodiment shown in FIG. 21 in that: the switching circuit 60h includes an integrating circuit 66 and a comparator 67 instead of the one-shot pulse generation circuit 61d and the two inverters I6 and I7. In addition, in the ninth embodiment, the output signal of the AND circuit 65 is designated by Ss1.

When the output signal Ss1 of the AND circuit 65 has transitioned to [H], the integrating circuit 66 integrates the output signal Ss1 and outputs a signal Sint. The signal Sint has a value corresponding to the time for which the output signal Ss1 of the AND circuit 65 is kept at [H]. The comparator 67 compares the signal Sint with a determination value Tth. Further, the comparator 67 outputs a signal Scmp_int at [L] when the signal Sint is greater than the determination value Tth, and outputs the signal Scmp_int at [H] when the signal Sint is less than or equal to the determination value Tth. The signal Scmp_int outputted from the comparator 67 is inputted to an AND circuit 65h. When the signal Scmp_int, which is the output of the comparator 67, is at [L], the output of the AND circuit 65h is also at [L]. In contrast, when the output of the comparator 67 is at [H], the output of the AND circuit 65h is identical to the output Ss1 of the AND circuit 65.

As described above, according to the ninth embodiment, when the state of the signal Ss1 has become [H] and thus the power transmission circuit 40 has been switched from the non-resonant state to the resonant state, the integration circuit 66 counts the time for which the power transmission circuit 40 is kept in the resonant state. Moreover, when the signal Sint, which is the counting result, becomes greater than or equal to the determination value Tth, the power transmission circuit 40 is switched to the non-resonant state. As a result, failures due to heat generation in the power transmission circuit 40 can be prevented.

Tenth Embodiment

In the above-described first to ninth embodiments, when the vehicle 202 approaches the power transmission circuit 40, the physical quantity is measured which corresponds the degree of coupling between the power transmission circuit 40 and the power reception circuit 240 that includes the power reception coil 241 provided in the vehicle 202; and the state of the power transmission circuit 40 is set to the resonant state or the non-resonant state based on the measured physical quantity. In contrast, in the tenth embodiment, the power-reception-side control unit 220 provided in the vehicle 202 generates, with electric power charged in the battery 210, magnetic flux in the power reception coil 241; the generated magnetic flux causes the physical quantity of the power transmission circuit 40 to change; and the change in the physical quantity causes the state of the power transmission circuit 40 to transition from the non-resonant state to the resonant state.

Specifically, when the power reception coil 241 provided in the vehicle 202 approaches the power transmission coil 41 of the power transmission circuit 40, the degree of coupling between the power transmission coil 41 and the power reception coil 241 increases and thus the electric current flowing through the power transmission coil 41 also increases, as in the first embodiment. At this time, upon the power-reception-side control unit 220 setting the power reception circuit 240 to a resonant state and supplying electric power from the battery 210 to the power reception circuit 240, magnetic flux is generated in the power reception coil 241; and the generated magnetic flux passes through the power transmission coil 41. As a result, the voltage of the power transmission coil 41 increases. In this way, the power-supply-side control unit 20 can actively switch the power transmission circuit 40 from the non-resonant state to the resonant state.

As described above, according to the tenth embodiment, the power reception system 200 provided in the vehicle 202 can actively work on the power transmission system 100 provided on the ground side to switch the state of the power transmission circuit 40 from the non-resonant state to the resonant state. That is, when the power reception system 200 necessitates supply of electric power, it can request the power transmission system 100 to supply electric power to it. In addition, in the tenth embodiment, the configuration for detecting and determining the physical quantity and the threshold values used may be the same as those in the first to the ninth embodiments. In this case, the degree of freedom in switching the power transmission circuit 40 between the non-resonant state and the resonant state can be improved.

In the tenth embodiment, when an abnormality has occurred in the power reception system 200 provided in the vehicle 202, the physical quantity of the power transmission system 100 on the ground side, for example, the voltage of the power transmission coil 41 changes due to the abnormality. For example, when the power-reception-side control unit 220 has detected an abnormality in the power reception system 200 and has performed a protective operation to interrupt the supply of electric power from the power transmission system 100, the voltage of the power transmission coil 41 in the resonant state (i.e., the second state) of the power transmission circuit 40 drops below the threshold value Vth_on_L. Then, upon detecting the drop of the voltage of the power transmission coil 41 below the threshold value Vth_on_L, the power-supply-side control unit 20 switches the state of the power transmission circuit 40 from the resonant state to the non-resonant state.

Moreover, in the tenth embodiment, depending on the form of the abnormality occurring in the power reception system 200, the voltage of the power transmission coil 41 in the resonant state (i.e., the second state) of the power transmission circuit 40 may become abnormally high. Then, upon detecting the abnormally high voltage of the power transmission coil 41, the power-supply-side control unit 20 switches the state of the power transmission circuit 40 from the resonant state to the non-resonant state.

To sum up, in the tenth embodiment, when the magnitude of the physical quantity has exceeded an upper limit of a predetermined range or has dropped below a lower limit of the predetermined range, the power-supply-side control unit 20 determines that an abnormality has occurred in the power reception circuit 240, and switches the state of the power transmission circuit 40 from the second state to the first state. Consequently, the power transmission circuit 40 can be prevented from adversely affecting the power reception system 200. Moreover, the degree of freedom in switching the power transmission circuit 40 between the non-resonant state and the resonant state can be improved.

The present disclosure is not limited to the above-described embodiments, but can be implemented in various configurations without departing from the gist of the present disclosure. For example, technical features of the embodiments may be replaced or combined as appropriate for solving some or all of the above-described problems or for achieving some or all of the above-described advantageous effects. Moreover, the technical features may be removed as appropriate unless they are specified as essential in the present specification.

What is claimed is:

1. A power supply system for supplying electric power to a traveling vehicle in a wireless manner, the power supply system comprising:
   a power transmission circuit which includes, on a ground side, a power transmission coil and a capacitor and whose impedance is switchable between a first impedance and a second impedance that is lower than the first impedance;
   a high frequency generation circuit connected with the power transmission circuit to supply high-frequency electric power of a predetermined frequency to the power transmission coil of the power transmission circuit;
   a measurement unit that measures a physical quantity corresponding to a degree of coupling between the power transmission circuit and a power reception circuit that includes a power reception coil provided in the vehicle; and
   a control unit that controls transmission of electric power from the power transmission circuit to the power reception circuit,
   wherein:
   when the degree of coupling is determined, based on the measured physical quantity, to be lower than a predetermined degree, the control unit sets the power transmission circuit supplied with the high-frequency electric power to a first state that is a non-resonant state by setting the impedance of the power transmission circuit to the first impedance; and
   when the degree of coupling is determined, based on the measured physical quantity, to be higher than or equal to the predetermined degree, the control unit sets the power transmission circuit supplied with the high-frequency electric power to a second state that is a resonant state by setting the impedance of the power transmission circuit to the second impedance.

2. The power supply system as set forth in claim 1, wherein:
   the physical quantity corresponding to the degree of coupling between the power transmission circuit and the power reception circuit is a degree of resonance between the power transmission circuit and the power reception circuit.

3. The power supply system as set forth in claim 1, wherein:
   the physical quantity has a first value when an inter-coil distance between the power transmission coil and the power reception coil is a first distance, and has a second value which is greater than the first value when the inter-coil distance is a second distance which is shorter than the first distance.

4. The power supply system as set forth in claim 1, wherein:
   in each of the first and second states of the power transmission circuit, the physical quantity becomes maximum when the power reception coil and the power transmission coil become closest to each other.

5. The power supply system as set forth in claim 1, wherein:
   the capacitor of the power transmission circuit comprises a plurality of capacitors;
   the power transmission circuit further includes a switch for connecting and disconnecting at least one of the plurality of capacitors; and
   the control unit switches the power transmission circuit between the first state and the second state by turning on and off the switch.

6. The power supply system as set forth in claim 1, wherein:
   the capacitor of the power transmission circuit comprises a variable capacitance capacitor; and
   the control unit switches the power transmission circuit between the first state and the second state by varying the capacitance of the variable capacitance capacitor.

7. The supply system as set forth in claim 1, wherein:
   the power transmission coil has a tap connectable to the power transmission circuit; and
   the control unit changes the inductance of the power transmission coil by connecting the tap to or disconnecting the tap from the power transmission circuit, thereby switching the power transmission circuit between the first state and the second state.

8. The power supply system as set forth in claim 1, wherein:
   the power transmission circuit is set to the first state;
   in the first state, when the power reception coil approaches the power transmission coil so that the physical quantity becomes greater than or equal to a first threshold value, the control unit switches the power transmission circuit to the second state and thereby sets the power transmission circuit to a power supply state in which electric power is supplied from the power transmission coil to the power reception coil; and
   in the second state, when the power reception coil moves away from the power transmission coil so that the physical quantity becomes less than a second threshold value that is greater than the first threshold value, the control unit switches the power transmission circuit to the first state and thereby stops the supply of electric power from the power transmission coil to the power reception coil.

9. The power supply system as set forth in claim 8, wherein:
   the measurement unit measures a plurality of types of physical quantities as the physical quantity corresponding to the degree of coupling; and
   when the power transmission circuit is in the second state, the control unit performs the switching of the power transmission circuit from the second state to the first state using one of the plurality of types of physical quantities which is different from the physical quantity used for the switching of the power transmission circuit from the first state to the second state.

10. The power supply system as set forth in claim 8, wherein:
when the physical quantity has not become greater than or equal to a third threshold value, which is greater than the second threshold value, within a predetermined period after the power transmission circuit is switched to the second state, the control unit switches the power transmission circuit to the first state and thereby stops the supply of electric power from the power transmission coil to the power reception coil.

11. The power supply system as set forth in claim 1, wherein:
when having switched the power transmission circuit from the second state to the first state, the control unit keeps the power transmission circuit in the first state for an off-keeping time.

12. The power supply system as set forth in claim 11, wherein:
the control unit sets the off-keeping time, for which the power transmission circuit is kept in the first state, according to the length of time for which the power transmission circuit was kept in the second state before being switched to the first state.

13. The power supply system as set forth in claim 11, further comprising a temperature sensor that measures a temperature of the power transmission circuit,
wherein:
the control unit sets the off-keeping time, for which the power transmission circuit is kept in the first state, according to the temperature of the power transmission circuit when the power transmission circuit was switched from the second state to the first state.

14. The power supply system as set forth in claim 1, wherein:
the physical quantity is one of a voltage between both ends of the power transmission coil, electric current flowing through the power transmission coil, magnetic flux generated by the power transmission coil and a voltage between both ends of the capacitor.

15. The power supply system as set forth in claim 1, further comprising a detection coil that is electrically insulated from the power transmission coil and magnetically coupled with the power transmission coil,
wherein:
the control unit uses, as the physical quantity, a voltage between both ends of the detection coil and a voltage between both ends of the capacitor of the power transmission circuit.

16. The power supply system as set forth in claim 1, wherein:
the control unit restores the power transmission circuit to the second state for a certain period of time after switching the power transmission circuit from the second state to the first state.

17. The power supply system as set forth in claim 1, wherein:
after switching the power transmission circuit from the first state to the second state, the control unit counts the time for which the power transmission circuit is kept in the second state, and switches the power transmission circuit from the second state to the first state when the counted time becomes greater than or equal to a determination value.

18. The power supply system as set forth in claim 1, wherein:
the control unit switches the power transmission circuit to the first state when a temperature of the power transmission circuit is higher than or equal to a threshold value.

19. The power supply system as set forth in claim 1, wherein:
the control unit switches the power transmission circuit to the first state when electric current flowing through the power transmission circuit is higher than or equal to a threshold value.

20. The power supply system as set forth in claim 1, wherein:
the measuring unit detects the magnitude of a change in the physical quantity caused by magnetic flux from the power reception coil provided in the vehicle; and
when the magnitude of the change in the physical quantity is greater than or equal to a predetermined threshold value, the control unit switches the power transmission circuit from the first state to the second state.

21. The power supply system as set forth in claim 20, wherein:
when the magnitude of the change in the physical quantity has become greater than or equal to the predetermined threshold value and it is determined that an abnormality has occurred in the power reception circuit, the control unit switches the power transmission circuit from the second state to the first state.

* * * * *